US006902021B2

(12) United States Patent
Kikuchi et al.

(10) Patent No.: US 6,902,021 B2
(45) Date of Patent: Jun. 7, 2005

(54) AUTO-CRUISE APPARATUS

(75) Inventors: Hayato Kikuchi, Wako (JP); Hiroshi Sato, Wako (JP); Toshiaki Arai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 121 days.

(21) Appl. No.: 09/989,702

(22) Filed: Nov. 21, 2001

(65) Prior Publication Data

US 2002/0121398 A1 Sep. 5, 2002

(30) Foreign Application Priority Data

Dec. 13, 2000 (JP) ........................................ 2000-379392

(51) Int. Cl.[7] .............................................. B60K 31/00
(52) U.S. Cl. ...................... 180/170; 180/174; 701/93; 701/96
(58) Field of Search ................................ 180/169, 170, 180/174; 701/93, 96

(56) References Cited

U.S. PATENT DOCUMENTS

| | | | | |
|---|---|---|---|---|
| 5,230,400 A | * | 7/1993 | Kakinami et al. | 180/169 |
| 5,396,426 A | * | 3/1995 | Hibino et al. | 701/96 |
| 5,454,442 A | * | 10/1995 | Labuhn et al. | 180/169 |
| 5,587,908 A | * | 12/1996 | Kajiwara | 701/93 |
| 5,594,645 A | * | 1/1997 | Nishimura et al. | 701/96 |
| 5,689,422 A | * | 11/1997 | Heymann et al. | 701/93 |
| 5,695,020 A | * | 12/1997 | Nishimura | 180/169 |
| 5,771,007 A | * | 6/1998 | Arai et al. | 340/903 |
| 5,871,062 A | * | 2/1999 | Desens et al. | 180/169 |
| 6,044,321 A | * | 3/2000 | Nakamura et al. | 701/96 |
| 6,116,369 A | * | 9/2000 | King et al. | 180/169 |
| 6,185,499 B1 | * | 2/2001 | Kinoshita et al. | 701/96 |
| 6,226,588 B1 | * | 5/2001 | Teramura et al. | 701/93 |
| 6,339,740 B1 | * | 1/2002 | Seto et al. | 701/96 |
| 6,526,346 B2 | * | 2/2003 | Ishizu et al. | 701/96 |
| 6,554,090 B1 | * | 4/2003 | Kuroda et al. | 180/170 |

FOREIGN PATENT DOCUMENTS

JP 11-42957 2/1999

* cited by examiner

Primary Examiner—Christopher P. Ellis
Assistant Examiner—Christopher Bottorff
(74) Attorney, Agent, or Firm—Arent Fox PLLC

(57) ABSTRACT

An auto-cruise apparatus having a constant vehicle speed controller and a mode selector is provided. The constant vehicle speed controller controls the vehicle speed such that the vehicle speed is maintained at the set vehicle speed whether a preceding vehicle may exist or not. The mode selector selects in accordance with predetermined operations upon the input means, either a vehicle-to-vehicle distance control mode in which a travel of the subject vehicle is controlled by the vehicle-to-vehicle distance controller or a constant vehicle speed control mode in which the travel is controlled by the constant vehicle speed controller. A travel control by either the vehicle-to-vehicle distance controller or the constant vehicle speed controller is performed in accordance with a travel mode that has been selected by the mode selector.

4 Claims, 17 Drawing Sheets

FIG. 14
(a) 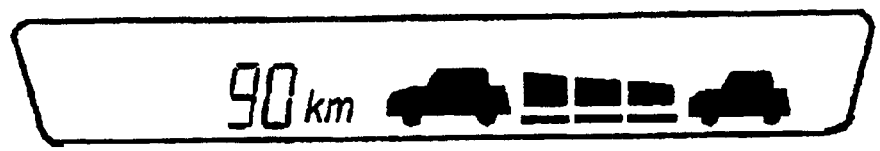
(b) 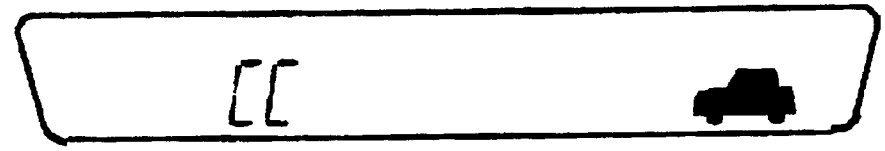
(c) 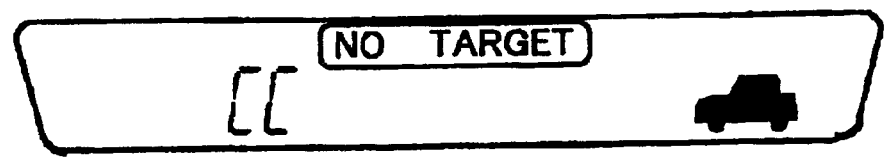

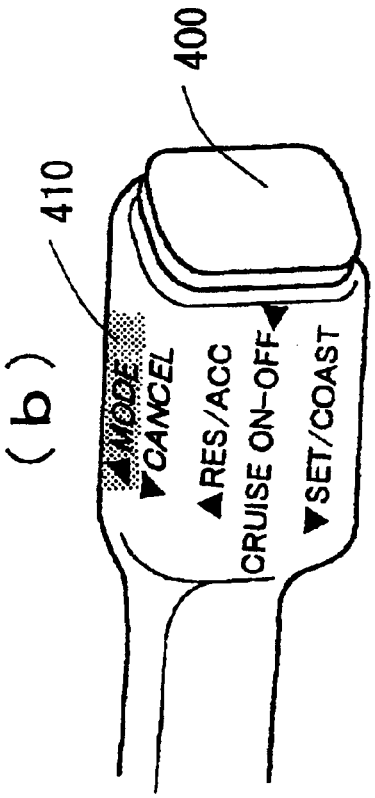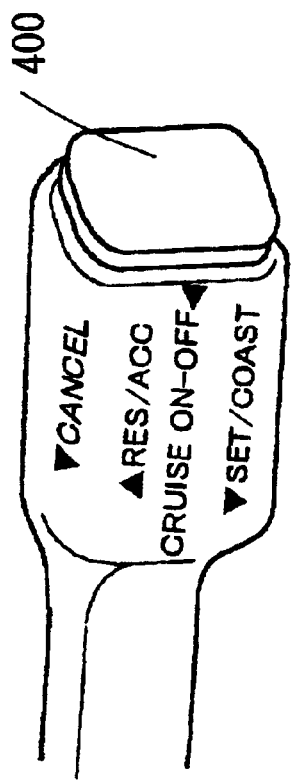
FIG. 17

AUTO-CRUISE APPARATUS

FIELD OF THE INVENTION

The invention relates to a system that is capable to switch the travel mode between a cruise control travel with a constant vehicle speed and a cruise control travel equipped with a vehicle-to-vehicle distance control function for controlling the distance from the preceding vehicle.

BACKGROUND OF THE INVENTION

Conventionally, a cruise control system (referred to as "CC system" hereinafter) has been developed as a system that performs a constant vehicle speed travel for maintaining a vehicle speed at a set vehicle speed. According to this system, the driver may depress a predetermined switch when the vehicle speed reaches a desired speed by means of the driver's acceleration/deceleration operation upon the accelerator pedal, so that the vehicle speed may be set to the speed at that moment when the switch has been depressed and thereafter the vehicle may travel constantly at the set vehicle speed. During this "constant speed control mode", since the vehicle speed can be maintained without the driver's depression on the accelerator pedal, the driver's burden could be reduced especially when traveling through expressways.

On the other hand, recently there has been proposed and developed a cruise control system equipped with a vehicle-to-vehicle distance control capability (this system is called "adaptive cruise control system", which will be simply referred to as ACC system hereinafter). In the ACC system, a preceding vehicle is detected by means of radar, camera and the like, and if any preceding vehicle is not detected, the system performs a "constant speed travel" in which the set vehicle speed is maintained, but if the preceding vehicle is detected, it performs a "constant vehicle-to-vehicle distance travel" in which the set vehicle-to-vehicle distance is maintained. Such travel mode in which the vehicle-to-vehicle distance and the vehicle speed are adjusted depending on whether the preceding vehicle exists or not will be referred to as "vehicle-to-vehicle distance control mode" hereinafter.

Japanese Patent Application Laid-open No. H11-42957 discloses an example of such cruise control system that implements a vehicle-to-vehicle distance control mode. This system is so designed that the driver can select and set the desired distance by switching to either of three predefined stages of vehicle-to-vehicle distance, and the driver can easily see, at a glance, which distance is currently set.

The above-referenced Japanese Patent Application Laid-open No. H11-42957 further discloses a lever-like switch as a cruise control switch as illustrated in (a) of FIG. 17. The driver depresses the main switch 400 provided on the side portion of the lever so as to activate the cruise control system. After having accelerated or decelerated the vehicle speed up to the desired speed, the driver can set that moment speed as the set vehicle speed by pushing down and then releasing the lever (namely, by turning the ST/COAST switch to ON). If the driver pulls the lever (namely, turns the CANCEL switch to ON), the cruise control system will be canceled. Besides, after the driver has canceled the cruise control system through some operation upon the brake pedal, if the driver pushes up and then releases the lever (namely turns the RES/ACC switch to ON), the cruise control system will resume the vehicle-to-vehicle distance control.

Since it is easy to add a CC system onto an ACC system, some systems that use alternately an ACC system and a CC system are proposed in recent years. (b) of FIG. 17 shows an example of switches which are currently implemented to realize such systems. The switch shown in (b) of FIG. 17 is basically equivalent to the switch shown in (a) of FIG. 17 but it is additionally provided with a new contact point MODE 410. If the lever is pushed forward for a predetermined time period (namely, the MODE switch is turned to ON) in the state when the vehicle-to-vehicle distance control is not performed by the ACC system, the travel mode will be changed from the vehicle-to-vehicle distance control to the constant vehicle speed control.

Generally, on relatively traffic-congestive roads, the vehicle-to-vehicle distance control is convenient for the driver in terms of decreasing burden of the driver because the adjustments for the vehicle-to-vehicle distance and/or the vehicle speed are performed depending on the environmental road condition when the vehicle travels according to the vehicle-to-vehicle distance control mode. On the contrary, on less traffic-congestive roads, if the vehicle-to-vehicle distance control mode is selected, the driver may encounter an undesired deceleration. Accordingly, in such situation, the driver can travel more comfortably by selecting the constant vehicle speed mode.

However, there is a problem of requiring an extra cost for providing a new contact point onto the conventional cruise control switch as shown in (b) of FIG. 17. Thus, there is a need for such system that can switch the mode between the vehicle-to-vehicle distance control and the vehicle speed control without any extra cost.

Furthermore, when a subject vehicle detects a preceding vehicle traveling at a slower speed than that of the subject vehicle while the subject vehicle is traveling at a set vehicle speed, the subject vehicle may approach to the preceding vehicle keeping that moment speed in case of the travel in the constant vehicle speed control mode, but in case of travel in the vehicle-to-vehicle distance control mode, an automatic deceleration may be performed so as to maintain the set vehicle-to-vehicle distance. Thus, there is no problem even if the subject vehicle actually travels in the vehicle-to-vehicle distance control mode although the driver assumes the constant vehicle speed control mode. However, if the subject vehicle actually travels in the constant vehicle speed control mode although the driver assumes the vehicle-to-vehicle distance control mode, any deceleration action may not be taken as expected by the driver in such occasion that a slower preceding vehicle appears ahead as aforementioned. This may impose a kind of commotion to the driver.

Accordingly, it is desirable that a mode switching from the vehicle-to-vehicle distance control to the constant vehicle speed control should be performed only if the driver explicitly intends such mode switching, so that an unintended mode switching that may be easily caused by wrong or careless operations could be prevented. On the contrary, it is desirable that a simple mode switching from the constant vehicle speed control to the vehicle-to-vehicle distance control should be allowed so as to improve the driver's convenience.

SUMMARY OF THE INVENTION

In order to resolve the aforementioned problems, a first aspect of the invention provides an auto-cruise apparatus comprising a vehicle-to-vehicle distance controller for controlling a vehicle speed of a subject vehicle with a set vehicle speed as an upper limit of said vehicle speed such that a vehicle-to-vehicle distance between said subject vehicle and a preceding vehicle becomes equal to a set vehicle-tovehicle distance and controlling said vehicle speed such that said vehicle speed becomes equal to said set vehicle speed when it is determined that there exists no preceding vehicle and input means capable of being operated by a driver with regard to a vehicle-to-vehicle distance control performed by said vehicle-to-vehicle distance controller wherein said set vehicle-to-vehicle distance and said set vehicle speed can be set by said driver via said input means. The auto-cruise apparatus further comprises a constant vehicle speed controller for controlling said vehicle speed such that said vehicle speed is maintained at said set vehicle speed whether a preceding vehicle may exist or not and a mode selector for selecting, in accordance with predetermined operations upon said input means, either a vehicle-to-vehicle distance control mode in which a travel of said subject vehicle is controlled by said vehicle-to-vehicle distance controller or a constant vehicle speed control mode in which said travel is controlled by said constant vehicle speed controller, wherein a travel control by either said vehicle-to-vehicle distance controller or said constant vehicle speed controller is performed in accordance with a travel mode that has been selected by said mode selector.

In accordance with the first aspect of the invention, it is possible to make a mode switching between the vehicle-to-vehicle distance control and the constant vehicle speed control through the existing input means designed to operate the vehicle-to-vehicle distance control. With this capability, a travel control switching can be performed without incurring a high cost.

In accordance with a second aspect of the invention, the mode selector in the auto-cruise apparatus in accordance with the first aspect of the invention is constructed to select said vehicle-to-vehicle distance control mode when said predetermined operations upon said input means comprise such operations that have a operating time less than a predetermined time period and select said constant vehicle speed control mode when said predetermined operations upon said input means comprise such operations that have an operating time equal to or more than a predetermined time period.

In accordance with the second aspect of the invention, since the constant vehicle speed control mode is selected when the operation time is equal to or more than the predetermined time period and the vehicle-to-vehicle distance control mode is selected when the operation time is less than the predetermined time period, the selection of the constant vehicle speed control mode due to a wrong or careless operation could be prevented.

In accordance with a third aspect of the invention, the input means in the auto-cruise apparatus in accordance with the first or second aspect of the invention further comprises a cruise switch for switching between a control state in which a vehicle-to-vehicle distance control by said vehicle-to-vehicle distance controller or a constant vehicle speed control by said constant vehicle speed controller is performed and a non-control state in which both said vehicle-to-vehicle distance control and said constant vehicle speed control are disabled, and the mode selector is constructed to select either said vehicle-to-vehicle distance control mode or said constant vehicle speed control mode in accordance with predetermined operations upon said cruise switch.

In accordance with the third aspect of the invention, since the mode switching between the vehicle-to-vehicle distance control and the constant vehicle speed control can be performed by means of the existing switch designed for making the on/off of the vehicle-to-vehicle distance control function, the mode switching capability could be provided without incurring a high cost.

In accordance with a fourth aspect of the invention, the mode selector in the auto-cruise apparatus in accordance with the third aspect of the invention is constructed to select either said vehicle-to-vehicle distance control mode or said constant vehicle speed control mode in accordance with said predetermined operations upon said cruise switch if said predetermined operations upon said cruise switch are performed when the subject vehicle is in said non-control state.

In accordance with the fourth aspect of the invention, since the mode switching is performed only when both the vehicle-to-vehicle distance control and the constant vehicle speed control are in the disabled state, any mode switching due to a wrong or careless operation could be prevented.

In accordance with a fifth aspect of the invention, the mode selector in the auto-cruise apparatus in accordance with the first or second aspect of the invention is constructed to perform a switching from said vehicle-to-vehicle distance control mode to said constant vehicle speed control mode in response to predetermined operations upon said input means if the subject vehicle is in said vehicle-to-vehicle distance control mode and perform a switching from said constant vehicle speed control mode to said vehicle-to-vehicle distance control mode in response to predetermined operations upon said input means if the subject vehicle is in said constant vehicle speed control mode.

In accordance with the fifth aspect of the invention, since the mode switching can be performed directly between the vehicle-to-vehicle distance control and the constant vehicle speed control, the convenience for the mode switching could be enhanced.

In accordance with a sixth aspect of the invention, the mode selector in the auto-cruise apparatus in accordance with the fifth aspect of the invention is constructed to perform a switching to said non-control state if said predetermined operations upon said input means are performed when the subject vehicle is in either said vehicle-to-vehicle distance control mode or said constant vehicle speed control mode.

In accordance with the sixth aspect of the invention, since any switching among the vehicle-to-vehicle distance control mode, the constant vehicle speed control mode and the non-control state can be performed in accordance with the predetermined operations, the convenience for the mode switching could be further enhanced.

In accordance with a seventh aspect of the invention, the input means in the auto-cruise apparatus in accordance with the first aspect of the invention further comprises vehicle-to-vehicle distance setting means for setting said set vehicle-to-vehicle distance, and the mode selector is constructed to perform a switching from said constant vehicle speed control mode to said vehicle-to-vehicle distance control mode in response to such operation upon said vehicle-to-vehicle distance setting means that decreases said vehicle-to-vehicle distance when the subject vehicle is in said constant vehicle speed control mode.

In accordance with the seventh aspect of the invention, since it is possible to make a mode switching between the vehicle-to-vehicle distance control and the constant vehicle speed control through the existing vehicle-to-vehicle distance setting means designed to set the vehicle-to-vehicle distance, the mode switching capability could be provided without incurring a high cost.

In accordance with an eighth aspect of the invention, the input means in the auto-cruise apparatus in accordance with the first aspect of the invention further comprises vehicle-to-vehicle distance setting means for setting said set vehicle-to-vehicle distance, and the mode selector is constructed to perform a switching from said vehicle-to-vehicle distance control mode to said constant vehicle speed control mode in response to such operation upon said vehicle-to-vehicle distance setting means that increases said vehicle-to-vehicle distance and is performed for a predetermined time period or more when the subject vehicle is in said vehicle-to-vehicle distance control mode.

In accordance with the eighth aspect of the invention, since the mode switching to the constant vehicle speed control is performed only when the operations upon the vehicle-to-vehicle distance setting means is performed for a predetermined time period or more, any mode switching to the constant vehicle speed control due to a wrong or careless operation could be prevented.

In accordance with a ninth aspect of the invention, the vehicle-to-vehicle distance setting means in the auto-cruise apparatus in accordance with the eighth aspect of the invention is capable of setting said vehicle-to-vehicle distance to at least a long, middle or short distance, and the mode selector is constructed to perform a switching from said vehicle-to-vehicle distance control mode to said constant vehicle speed control mode in response to such operation upon said vehicle-to-vehicle distance setting means that increases said vehicle-to-vehicle distance and is performed for a predetermined time period or more when said vehicle-to-vehicle distance is set to long.

In accordance with the ninth aspect of the invention, since the mode switching to the constant vehicle speed control is performed only when the vehicle-to-vehicle distance is set to long and also the operations upon the vehicle-to-vehicle distance setting means is performed for a predetermined time period or more, any mode switching to the constant vehicle speed control due to a wrong or careless operation could be prevented.

In accordance with a tenth aspect of the invention, the input means in the auto-cruise apparatus in accordance with any aspect from the seventh to the ninth aspects further comprises a cruise switch for switching between a control state in which a vehicle-to-vehicle distance control by said vehicle-to-vehicle distance controller or a constant vehicle speed control by said constant vehicle speed controller is performed and a non-control state in which both said vehicle-to-vehicle distance control and said constant vehicle speed control are disabled, and the set vehicle-to-vehicle distance is set to middle when said non-control state is switched to said vehicle-to-vehicle distance control mode.

In accordance with the tenth aspect of the invention, since the set vehicle-to-vehicle distance is set to middle when the vehicle-to-vehicle distance control function is activated, any mode switching to the constant vehicle speed control due to a wrong or careless operation at the activation time of the vehicle-to-vehicle distance control function could be prevented.

In accordance with an eleventh aspect of the invention, in the auto-cruise apparatus in accordance with any aspect from the first to the tenth aspects of the invention, the set vehicle speed is set to a current vehicle speed when said vehicle-to-vehicle distance control mode is switched to said constant vehicle speed mode.

In accordance with the eleventh aspect of the invention, since the current vehicle speed is set as the set vehicle speed, it is possible to prevent any unexpected acceleration when the switching to the constant vehicle speed control mode is performed.

In accordance with a twelfth aspect of the invention, the auto-cruise apparatus in accordance with any aspect from the first and tenth aspects of the invention further comprises preceding vehicle determination means for determining a preceding vehicle that said subject vehicle should follow, and a switching from said vehicle-to-vehicle distance control mode to said constant vehicle speed mode by said mode selector is allowed only when said preceding vehicle determination means determines that there exists no preceding vehicle.

In accordance with the twelfth aspect of the invention, since a mode switching to the constant vehicle speed control is performed only when it is determined that there exists no preceding vehicle, it is possible to prevent such risk that an acceleration may be caused by a switching to the constant vehicle speed control mode regardless of the existence of a preceding vehicle.

In accordance with a thirteenth aspect of the invention, in the auto-cruise apparatus in accordance with any aspect from the first and tenth aspects of the invention, the set vehicle speed that has been already set is reset when a switching from said vehicle-to-vehicle distance control mode to said constant vehicle speed mode is performed.

In accordance with the thirteenth aspect of the invention, since the set vehicle speed is reset, it is possible to prevent any unexpected acceleration when the switching to the constant vehicle speed control mode is performed.

BRIEF DESCRIPTION OF THE DRAWINGS

FIG. 14 illustrates an example of the ACC mode display (a), an example of the CC mode display (b) and another example of the CC mode display (c);

FIG. 17 illustrates an operation switch (a) for the conventional cruise control system additionally equipped with a vehicle-to-vehicle distance control function and an operation switch (b) further provided with a contact point for switching between the vehicle-to-vehicle control mode and the constant vehicle speed control mode.

DETAILED DESCRIPTION OF THE PREFERRED EMBODIMENTS

Figure 1:
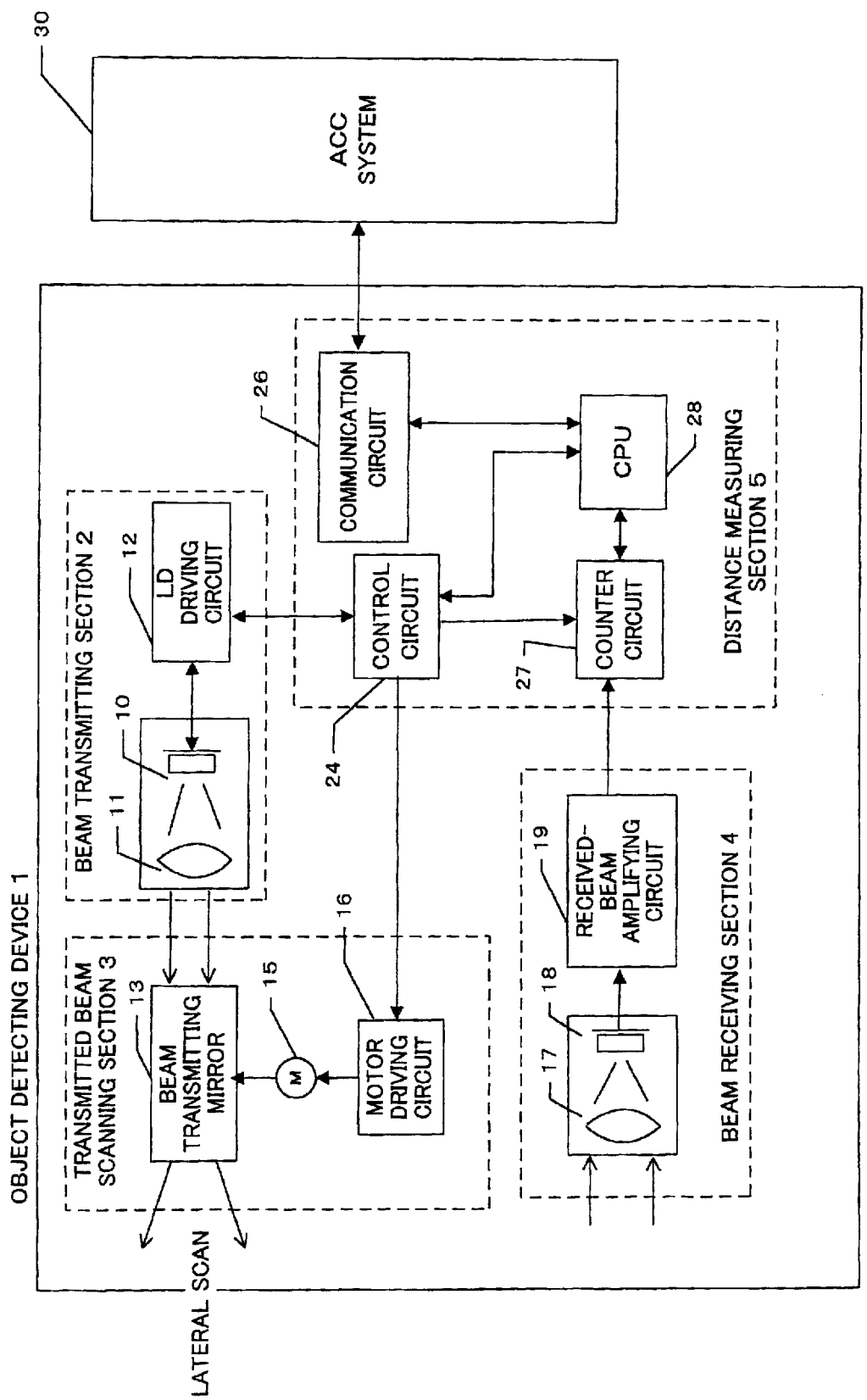
FIG. 1 is a block diagram illustrating a structure of an object detecting device in accordance with an embodiment of the invention.

Referring to the accompanying drawings, some embodiments of the invention will be explained in the following. FIG. 1 schematically illustrates a structure of an object detecting device in accordance with an embodiment of the invention.

The object detecting device 1 is equipped with a beam transmitting section 2, a transmitted-beam scanning section 3, a beam receiving section 4 and a distance measuring section 5, to detect the distance between a subject vehicle and an object existing ahead of the vehicle as well as the direction and the relative speed of that object. The beam-transmitting section 2 includes a laser diode 10, a beam transmitting lens 11 for focusing the laser beam transmitted from the laser diode 10 and a laser diode driving circuit 12 for driving the laser diode 10. The transmitted-beam scanning section 3 includes a beam transmitting mirror 13 for reflecting the laser output from the laser diode 10 via the beam transmitting lens 11 to irradiate the laser light forward, a motor 15 for reciprocally turning the beam transmitting mirror 13 about a vertical axis, and a motor driving circuit 16 for controlling the driving of the motor 15. The beam receiving section 4 includes a beam receiving lens 17, a photo-diode 18 for receiving the reflected beam focused by the beam receiving lens 17 to convert the beam into an electric signal as well as a received-beam amplifying circuit 19 for amplifying the signal output from the photo-diode 18.

The distance measuring section 5 includes a control circuit 24 for controlling the laser diode driving circuit 12 and the motor driving circuits 16, a communication circuit 26 for conducting communications with an ACC system 30, a counter circuit 27 for counting the time period from the transmission to the reception of the laser beam and a central processing unit (CPU) 28 for calculating the distance between the subject vehicle and the object and the direction and the relative speed of the object.

Referring to FIG. 1, the operation of the object detecting device 1 will be below explained. The control circuit 24 sends a light emission command to the LD driving circuit 12 to emit a pulse laser (the wave length of the laser beam is, for example, 870 nm). At the same time, the control circuit 24 sends a light emission timing signal to the counter circuit 27 to activate the counter. The laser beam transmitted by the laser diode 10 is focused on the beam transmitting lens 11 and then transmitted to the beam transmitting mirror 13. The beam transmitting mirror 13 is driven laterally so that the laser beam is scanned laterally by the beam transmitting mirror 13. The angle of the beam transmitting mirror 13 when the laser beam is transmitted by the beam transmitting mirror 13 is sent to the CPU 28 through the control circuit 24.

The transmitted laser beam is reflected by a reflector of the object existing ahead (the reflector is embedded in the tail lamp in case where the object is a preceding vehicle). The beam receiving lens 17 receives the reflected laser beam, which is converted to the electric signal by the photo-diode 18 and then amplified by the received-beam amplifying circuit 19. The amplified signal is sent to the counter circuit 27 and in response the counter, which has been started when the laser beam has been transmitted, is stopped. The counter value is sent to the CPU 28, which calculates the distance up to the object existing ahead and the direction of that object based on the aforementioned angle of the beam transmitting mirror and the counter value. Specifically, the distance up to the object may be calculated in accordance with following equation (1), so that the position of the object could be identified:

distance=light speed (about 300,000 km/s)×elapsed time from the light emission to the light reception/2 (1)

Figure 2:
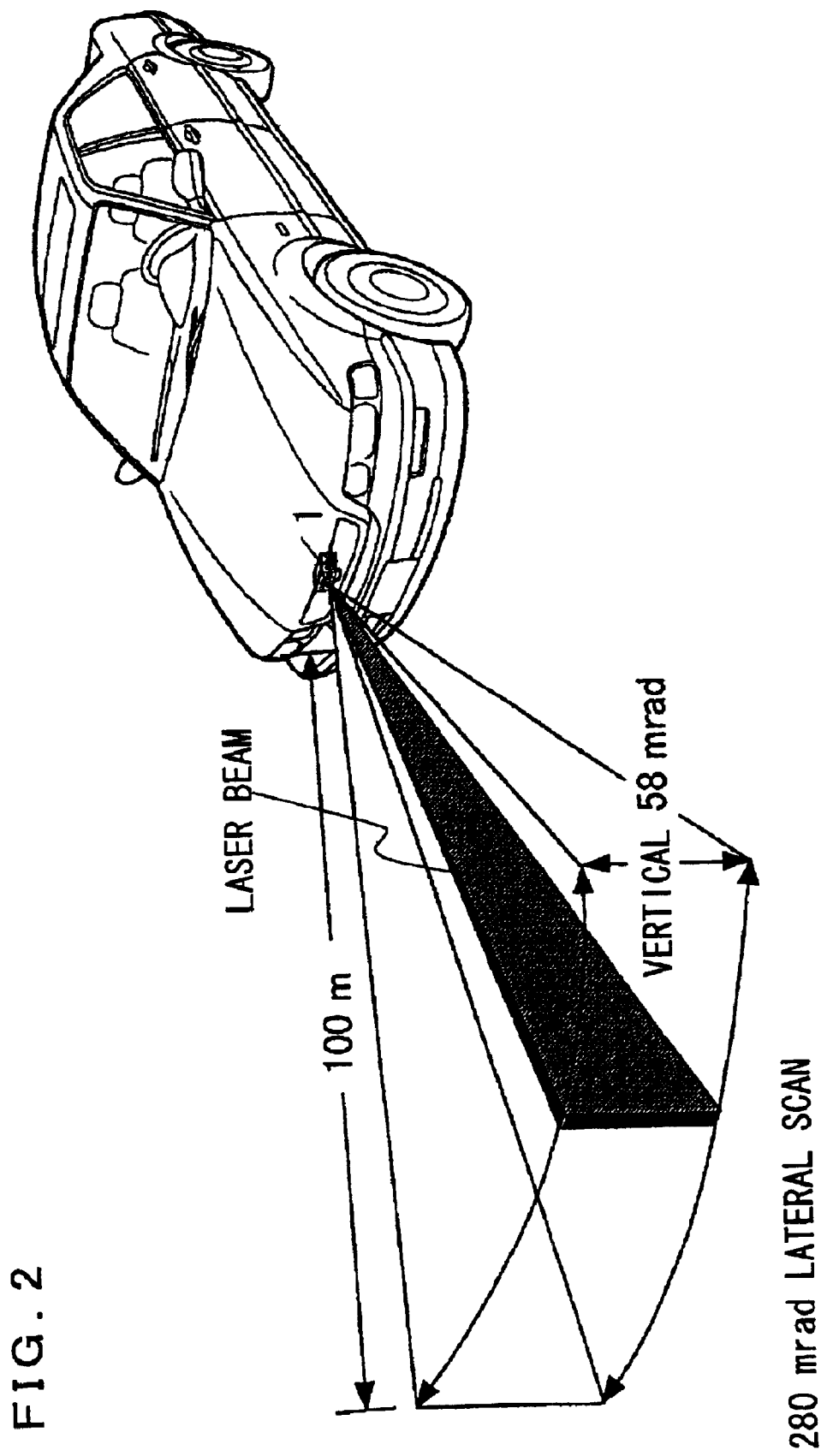
FIG. 2 illustrates the area to be detected by the object detecting device in an embodiment of the invention.

FIG. 2 illustrates a range that is scanned by the laser beam irradiated from the object detecting device 1. As shown in FIG. 2, the object detecting device 1 may be preferably disposed in the middle of the front grill of the vehicle so that it may not be so much influenced by the dusts rolled up by preceding vehicles while it can evenly detect preceding vehicles located on the left and right sides. In order to scan the front direction, the laser beam irradiated from the object detecting device 1 is arranged to form a sector-shape beam having a relatively narrow magnitude in the lateral direction and a vertical magnitude of 58 mrad (milli-radian), which corresponds to about 3.3 degrees, and to reciprocate in a given cycle (for example, 0.1 second) with a lateral angle of 280 mrad (about 16 degrees) so as to scan an area of the subject vehicle.

Figure 3:
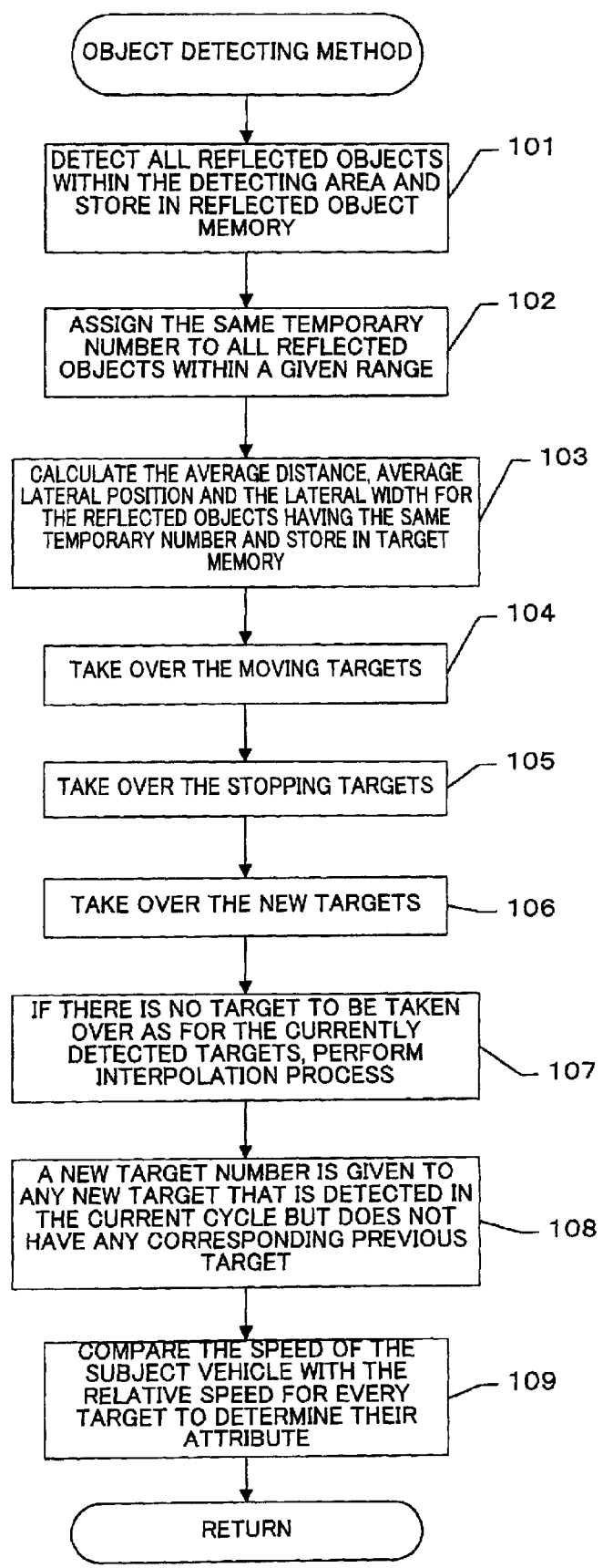
FIG. 3 is a flow chart illustrating how to detect an object in accordance with an embodiment of the invention.

FIG. 3 shows a process performed by the object detecting device 1 for detecting the object and calculating the position and the relative speed of the object. Detecting steps are repeated in a given cycle (for example 100 milliseconds).

In step 101, all reflected objects located within the detecting area are detected and stored in the reflected object memory. In step 102, the same temporary number is assigned to all reflected objects located within a given range (for example, within ±1.5 m, both laterally and ahead and behind). In step 103, All reflected objects having the same temporary number is grouped into one target, and for each target, average distance from the subject vehicle, average lateral position and the lateral width of the target (the distance between the two reflected objects located on the right-most and left-most sides within the concerned target) are calculated and those values are stored in the target memory.

In step 104, moving targets are taken over. Specifically, the moving targets are retrieved from the target memory for the previous cycle and based on the positions and the relative speeds of those moving targets, the current positions for those moving targets are estimated. Then, the current targets having the nearest positions to the estimated positions are determined to be identical with the moving targets that have been previously detected. As for the identical moving targets, their relative speeds are calculated based on the difference between the previous and current positions.

In step 105, stopping targets are taken over. Specifically, the stopping targets are retrieved from the target memory for the previous cycle and based on the positions and the relative speeds of those stopping targets, the current positions for those stopping targets are estimated. Then, the current targets having the nearest positions to the estimated positions are determined to be identical with the stopping targets that have been previously detected. As for the identical stopping targets, their relative speeds are calculated based on the difference between the previous and current positions.

In step 106, new targets are taken over. Specifically, the new targets are retrieved from the target memory for the previous cycle. Then, the current targets having the nearest positions to the positions of those new targets are determined to be identical with the new targets that have been previously detected. As for the identical targets, their relative speeds are calculated based on the difference between the previous and current positions.

In step 107, as for the currently detected targets, if there is no target that takes over a target in the previous cycle (namely, if there is no currently detected target corresponding to any target that has been detected in the previous cycle), an interpolation process performed for the previously detected targets. The interpolation process is performed by means of estimating the positions of the targets in the current cycle based on the past relative speed.

Furthermore, in step 108, a new target number is given to any new target that is detected in the current cycle but does not have any corresponding previous target (that is, a target that is newly detected in the current cycle).

In step 109, for each of the targets, the speed of the subject vehicle and the relative speed are compared. If the relative speed is near to the negative value of the subject vehicle speed, that target is regarded as a stopping target, and if the relative speed is different from the negative value of the subject vehicle speed, that target is regarded as a moving target (determination of attributes).

In this way, after such taking-over steps by the object detecting device 1 for all targets located in the detecting area of the laser diode as performed in steps 104 through 109, the positions, relative speed values and attributes obtained for the objects are sent to the ACC system 30.

The object detection may be implemented by any other method. For example, A milli-wave radar may be used instead of the aforementioned laser radar. Or, it may be possible to use an imaging device such as CCD camera to obtain the position and the relative speed of the object. Or, a combination of the radar and the imaging device may be used to detect the object located ahead of the subject vehicle.

Figure 4:
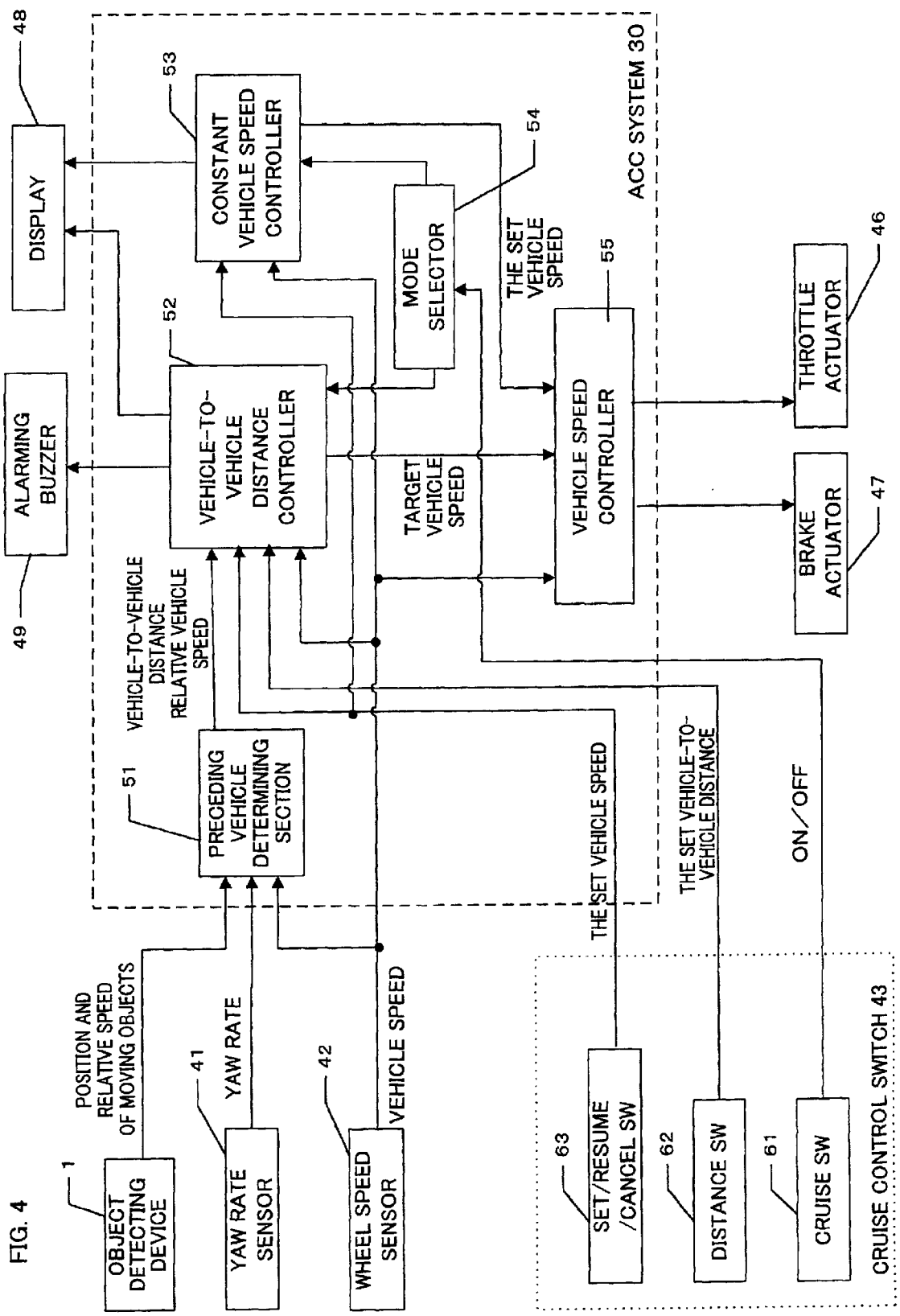
FIG. 4 is a block diagram illustrating a structure of an ACC system in accordance with an embodiment of the invention.

FIG. 4 schematically illustrates the ACC system 30 shown in FIG. 1. The ACC system 30 is to implement a vehicle-to-vehicle distance control mode and a constant vehicle speed control mode. The vehicle-to-vehicle distance control mode is for performing a constant vehicle speed travel in which a set vehicle speed is maintained when no preceding vehicle is detected as well as a constant vehicle-to-vehicle distance travel in which a set distance is maintained when any preceding vehicle is detected. In contrast, the constant vehicle speed control mode is for traveling always at the set vehicle speed whether any preceding vehicle may exist or nor. The ACC system 30 is actually implemented by an electronic control unit (ECU) comprising a central processing unit (CPU), a read-only memory (ROM) for storing a control program and control data and a random access memory (RAM) for providing a processing/working area for the CPU and storing various control data temporarily.

The input of the ACC system 30 connects to an object detecting device 1, a yaw rate sensor 41 and wheel speed sensors 42 for detecting a revolution speed of each wheel. Furthermore, the input of the ACC system 30 is connected to a cruise control switch 43 upon which the driver can operate with regard to the vehicle-to-vehicle distance control. The cruise control switch 43 consists of a cruise switch 61, a distance switch 62 and a set/resume/cancel switch 63.

The cruise switch 61 is provided with a conventional function for switching between the ON/OFF states of the vehicle-to-vehicle distance control and additionally a new function for switching between the vehicle-to-vehicle distance control mode and a constant vehicle speed control mode. In other words, the cruise switch 61 allows for switching between a control state in which either vehicle-to-vehicle distance control function or constant vehicle speed control function works and a non-control state in which both the vehicle-to-vehicle distance control function and the constant vehicle speed control function are disabled. The distance switch 62 is a switch for the driver to operate when the driver wants to set a vehicle-to-vehicle distance. The set/resume/cancel switch 63 is a switch for the driver to operate when the driver wants to set a constant vehicle speed, temporarily cancel the vehicle-to-vehicle distance control function and resume the vehicle-to-vehicle distance control function.

In another embodiment of the invention, instead of adding a mode switching function to the cruise switch 61 as mentioned above, a mode switching function may be added to a distance switch 62. In this arrangement, the cruise switch 61 may have a conventional function of switching ON/OFF states of the ACC system 30.

The output of the ACC system 30 is connected to a throttle actuator 46 for controlling the engine throttle in accordance with the instruction from the vehicle speed controller 55 as well as a brake actuator 47 for regulating the wheel brakes. The output of the ACC system 30 is further connected to a display 48 for displaying the operating states and the setting states of the vehicle-to-vehicle distance control and the constant vehicle speed control in accordance with the instructions from the vehicle-to-vehicle distance controller 52 and the constant vehicle speed control section 53 and a warning buzzer 49 for alarming in accordance with the instruction from the vehicle-to-vehicle distance controller 52.

The ACC system 30 comprises a preceding vehicle determining section 51, a vehicle-to-vehicle distance controller 52, a constant vehicle speed controller 53, a mode selector 54 and a vehicle speed controller 55. The preceding vehicle determining section 51 first estimates a travel trajectory of the subject vehicle based on a yaw rate and a vehicle speed which are received from the yaw rate sensor 41 and wheel speed sensors 42. Besides, the preceding vehicle determining section 51 receives the respective positions and relative speeds for the moving objects that are detected by the object detecting device 1. Then, the preceding vehicle determining section 51 determines that the preceding vehicle is the object, among the moving objects received from the object detecting device 1, which is located at the nearest position to the subject vehicle among the moving objects existing on the estimated travel trajectory of the subject vehicle.

The vehicle-to-vehicle distance controller 52 starts the vehicle-to-vehicle distance control in response to the selection of the vehicle-to-vehicle distance control by the mode selector 54. The vehicle-to-vehicle distance control mode for traveling in accordance with vehicle-to-vehicle distance control typically consists of the following four travel modes:
(1) travel so as to maintain the set vehicle speed when there is no preceding vehicle (constant vehicle speed mode);
(2) decelerate the vehicle speed so as to avoid approaching too much to the preceding vehicle when the speed of the preceding vehicle is slower than that of the subject vehicle (decelerating mode);

(3) follow the preceding vehicle so as to maintain the set vehicle-to-vehicle distance regarding the preceding vehicle with the set vehicle speed as the highest allowable speed (following mode); and (4) gradually increase the vehicle speed up to the set vehicle speed when the preceding vehicle disappears in the situation where the subject vehicle follows the preceding vehicle with the slower speed than that of the preceding vehicle (accelerating mode).

In order to implement the above-mentioned travel modes, the vehicle-to-vehicle distance controller 52 calculates the target vehicle speed as follows:

(1) constant speed travel mode: the vehicle-to-vehicle distance controller 52 outputs the set vehicle speed as the target vehicle speed in response to the determination of no preceding vehicle by the preceding vehicle determining section 51;

(2) decelerating mode: the vehicle-to-vehicle distance controller 52 adjusts the target vehicle speed so as to decrease the current speed to the speed of the preceding vehicle when the vehicle-to-vehicle distance controller 52 determines that the preceding vehicle travels at a slower speed than that of the subject vehicle based on the relative speed of the preceding vehicle that has been received from the preceding vehicle determining section 51;

(3) following mode: the vehicle-to-vehicle distance controller 52 calculates the difference between the vehicle-to-vehicle distance received from the preceding vehicle determining section 51 and the set vehicle-to-vehicle distance received via the distance switch 62 and then calculates the target vehicle speed so as to make that difference zero; and (4) accelerating mode: the vehicle-to-vehicle distance control section 52 adjusts the target vehicle speed so as to increase the current speed up to the set vehicle speed in response to detection of no preceding vehicle when the subject vehicle follows the preceding vehicle with a slower speed than that of the preceding vehicle.

The vehicle-to-vehicle distance controller 52 displays the current operating state and the setting state of the ACC system on the display 48. The vehicle-to-vehicle distance controller 52 also activates the warning buzzer 49 when the driver's attention is needed, for example, in case of too closely approaching to the preceding vehicle.

In response to selection of the constant vehicle speed mode by the mode selector 54, the constant vehicle speed controller 53 outputs the set vehicle speed as the target vehicle speed to start the constant vehicle speed control. Thus, the constant vehicle speed control is performed so as to maintain the set vehicle speed whether any preceding vehicle may exist or not (this is a constant vehicle speed control mode). Upon starting the constant vehicle speed control, the constant vehicle speed controller 53 displays an indicator on the display 48 to indicate that the constant vehicle speed control is now underway.

The mode selector 54 selects either vehicle-to-vehicle distance control by the vehicle-to-vehicle distance controller 52 or constant vehicle speed control by the constant vehicle speed controller 53 in accordance with predetermined operations upon the cruise switch 61. In response to predetermined operations upon the cruise switch 61, the mode selector 54 further performs a switching to no-control states in which both the vehicle-to-vehicle distance control by the vehicle-to-vehicle distance controller 52 and the constant vehicle speed control by the constant vehicle speed controller 53 are disabled.

If the mode switching function is provided on the distance switch 62 rather than the cruise switch 61, the mode selector 54 switches between the vehicle-to-vehicle distance control by the vehicle-to-vehicle distance controller 52 and the constant vehicle speed control by the constant vehicle speed controller 53 in accordance with predetermined operations upon the distance switch 62. In this case, the switching of the vehicle-to-vehicle distance control and the constant vehicle speed control to no-control state is performed via the cruise switch 61.

The vehicle speed controller 55 controls the throttle actuator 46 so as to reach the target vehicle speed received from the vehicle-to-vehicle distance controller 52 in the vehicle-to-vehicle distance control mode and controls the throttle actuator 46 so as to reach the target vehicle speed (namely the set vehicle speed) received from the constant vehicle speed controller 53 in the constant vehicle speed control mode. If the deceleration achieved by the throttle control is not sufficient for the required vehicle speed, the vehicle speed controller 55 may operate the brakes by means of driving the brake actuator 47.

Figure 5:
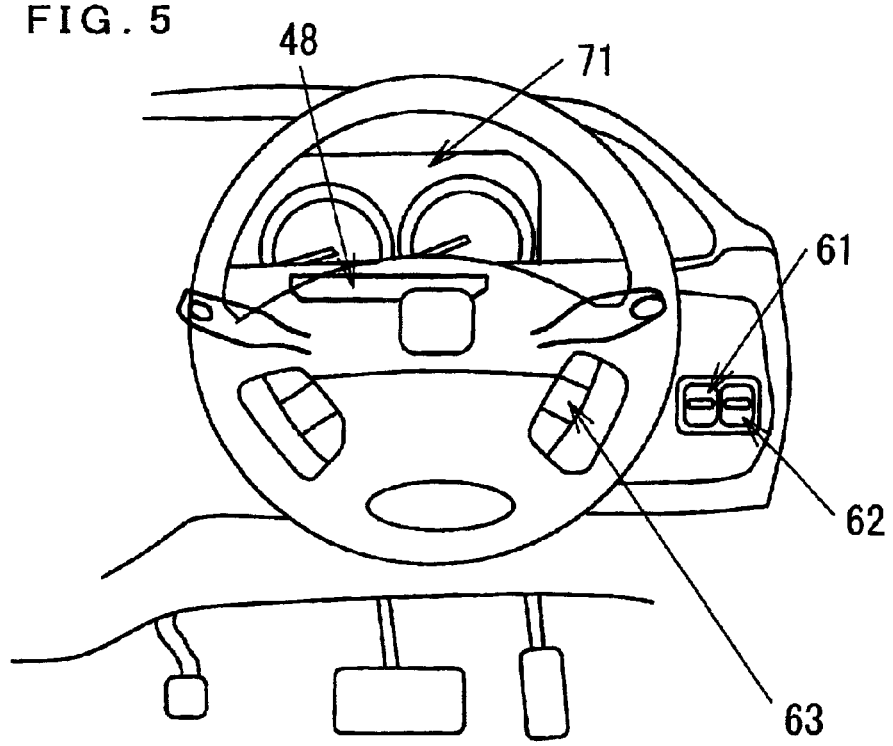
FIG. 5 illustrates an arrangement of a switch for operating the ACC system and a display for displaying information about the ACC system in accordance with an embodiment of the invention.

Now, the description about the cruise control switch 43 and the display 48 follows. FIG. 5 illustrates the vicinity of the steering wheel inside of the vehicle. As shown in FIG. 5, the cruise switch 61 and the distance switch 62 are disposed on the right and beneath side of the steering wheel and the set/resume/cancel switch 63 is disposed on the steering wheel. The display 48 is disposed on the front side of the combination meter 71 for displaying the set state and operating state of the ACC system.

Figure 6:
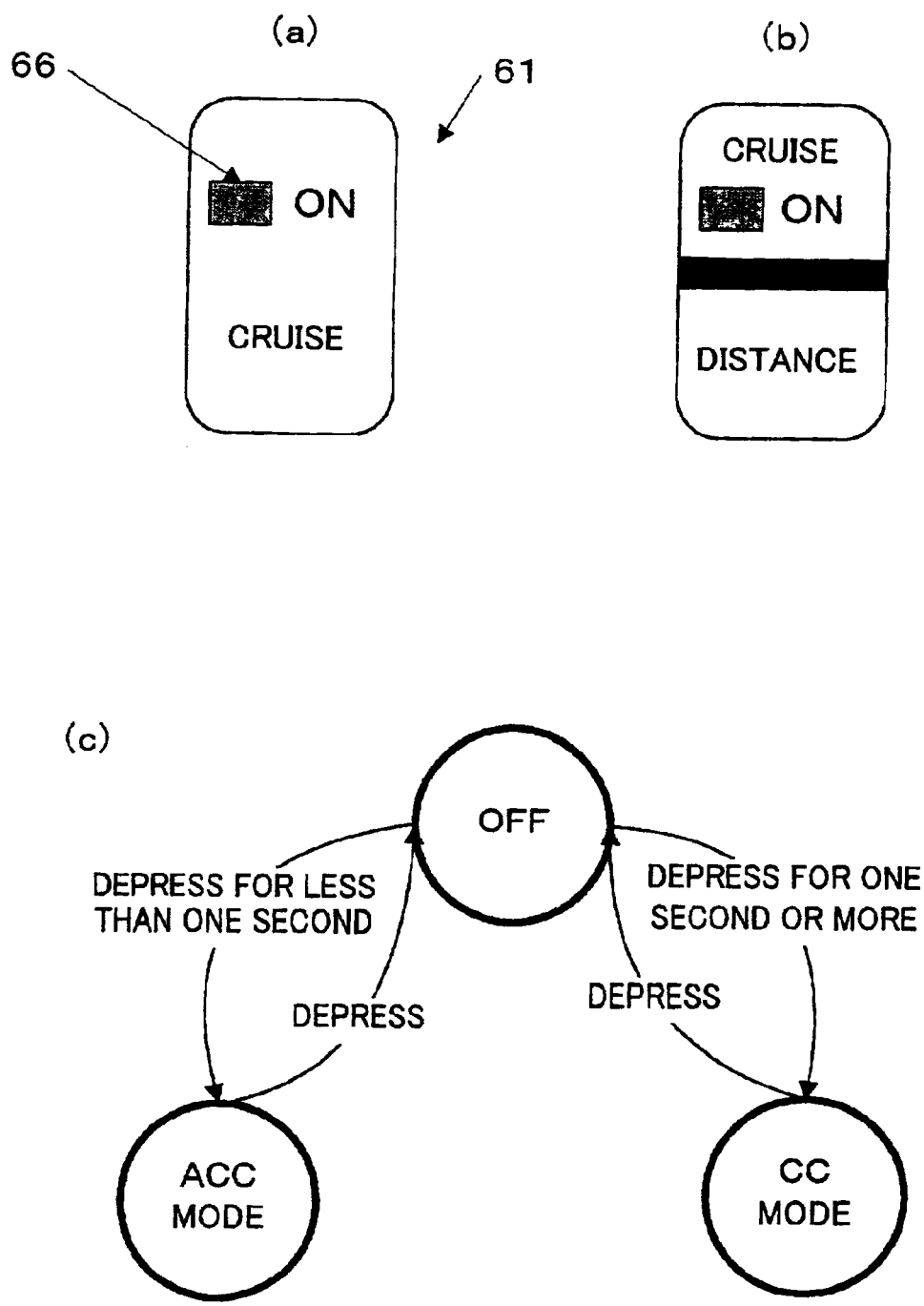
FIG. 6 illustrates a first embodiment of a cruise switch (a and b) and transitional states (c) in which the control states may transit in accordance with the operations upon the cruise switch in accordance with an embodiment of the invention.

FIG. 6 shows a first embodiment of the switch. FIG. 6 (a) shows an ON/OFF toggle type of cruise switch in which the ON/OF is switched over for each depression. FIG. 6 (b) shows an integrated type of cruise switch in which the ON/OFF toggle switch and the distance switch are integrated. With this integrated type switch, the ON/OF is switched over for each depression of the ON side of the switch and the set vehicle-to-vehicle distance is switched over in such sequence as in "long"→"middle"→"short"→"long"→ . . . for each depression of the DISTANCE side of the switch. If the switch is turned to ON, the indication lamp 66 located on the left side of "ON" is lightened.

FIG. 6 (c) illustrates how the control states of the ACC system are transited in accordance with operations upon the switch in the embodiment where the ON/OFF toggle type of cruise control switch as shown in either (a) or (b) of FIG. 6 is provided with a mode switching function. When the switch is in the OFF state, the ACC system is being placed in the OFF state (namely the travel control by the ACC system is not underway). The ACC system transits from the OFF state to either the vehicle-to-vehicle control mode (hereinafter simply referred to as "ACC mode") or the constant vehicle speed control mode (hereinafter simply referred to as "CC mode") depending on the time period during which the switch is being depressed. Namely, if the switch is depressed for less than a predetermined time period, the system may transit to the ACC mode, and if the switch is depressed for the predetermined time period or more, the system may transit to the CC mode. If the switch is depressed after the transition to either ACC mode or CC mode, the ACC system may return to the OFF state.

With this type switch as shown in FIG. 6 (c), there is no direct transition path between the ACC mode and the CC mode. Accordingly, since any transition to either mode must be performed via the OFF state, an easy switching operation from the ACC mode to the CC mode could be prevented.

Besides, the transition to the CC mode is performed only when the switch is depressed for the predetermined time period or more; namely, it is performed in accordance with the driver's explicit intention, so that the transition to the CC mode due to any careless or wrong operation could be prevented. The predetermined time period may be set to, for example, about 0.6 to 3.0 seconds. It is set to 1.0 second in the following embodiments.

Figure 7:
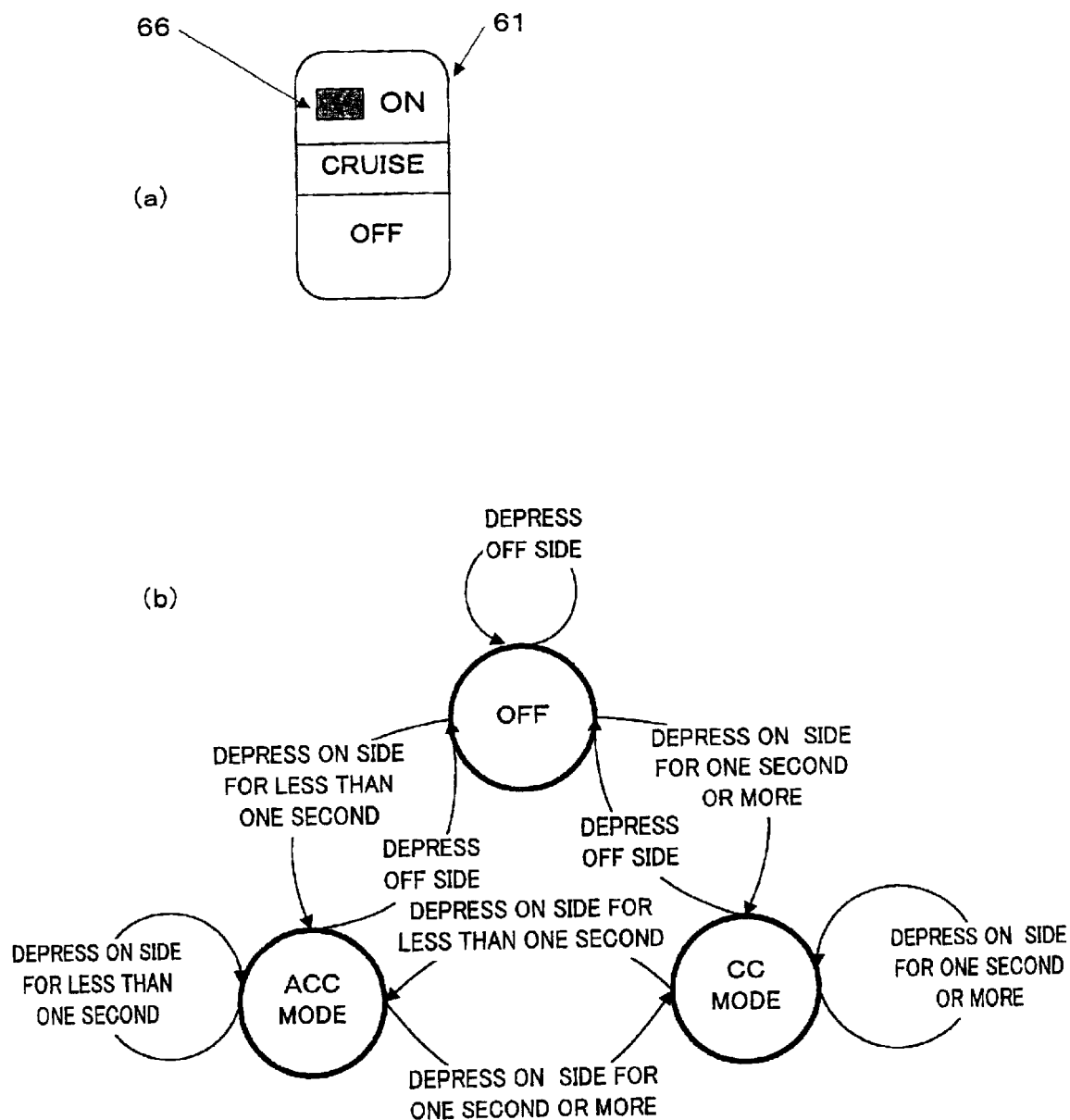
FIG. 7 illustrates a second embodiment of a cruise switch (a) and transitional states (b) in which the control states may transit in accordance with the operations upon the cruise switch in accordance with an embodiment of the invention.

FIG. 7 shows a second embodiment of the switch. FIG. 7 (a) shows an ON/OFF seesaw type of cruise switch in which the switch is turned to the ON state and the indication lamp 66 is lighted when the ON side is depressed and the switch is turned to the OFF state when the OFF side is depressed. FIG. 7 (b) illustrates how the control states of the ACC system are transited in accordance with the operation upon the switch in the embodiment where the ON/OFF seesaw type of cruise control switch as shown in FIG. 7 (a) is provided with a mode switching function. The difference of the FIG. 7 (b) embodiment from the FIG. 6 (c) embodiment is that there is a direct transition path between the ACC mode and the CC mode. Specifically, if the ON side is depressed for a predetermined time period or more when the system is in the ACC mode, the system is transited to the CC mode, and if the ON side is depressed for less than a predetermined time period when the system is in the CC mode, the system is transited to the ACC mode. Accordingly, since the transition to the CC mode needs the depression on the ON side for a longer time period, an easy transition to the CC mode could be prevented. In contrast, the transition to the ACC mode from the CC mode could be easily performed by means of depressing the ON side for a shorter time period. Furthermore, since any switching operation among the OFF state, the ACC mode and the CC mode could be performed freely, the convenience for the mode switching could be enhanced.

Figure 8:
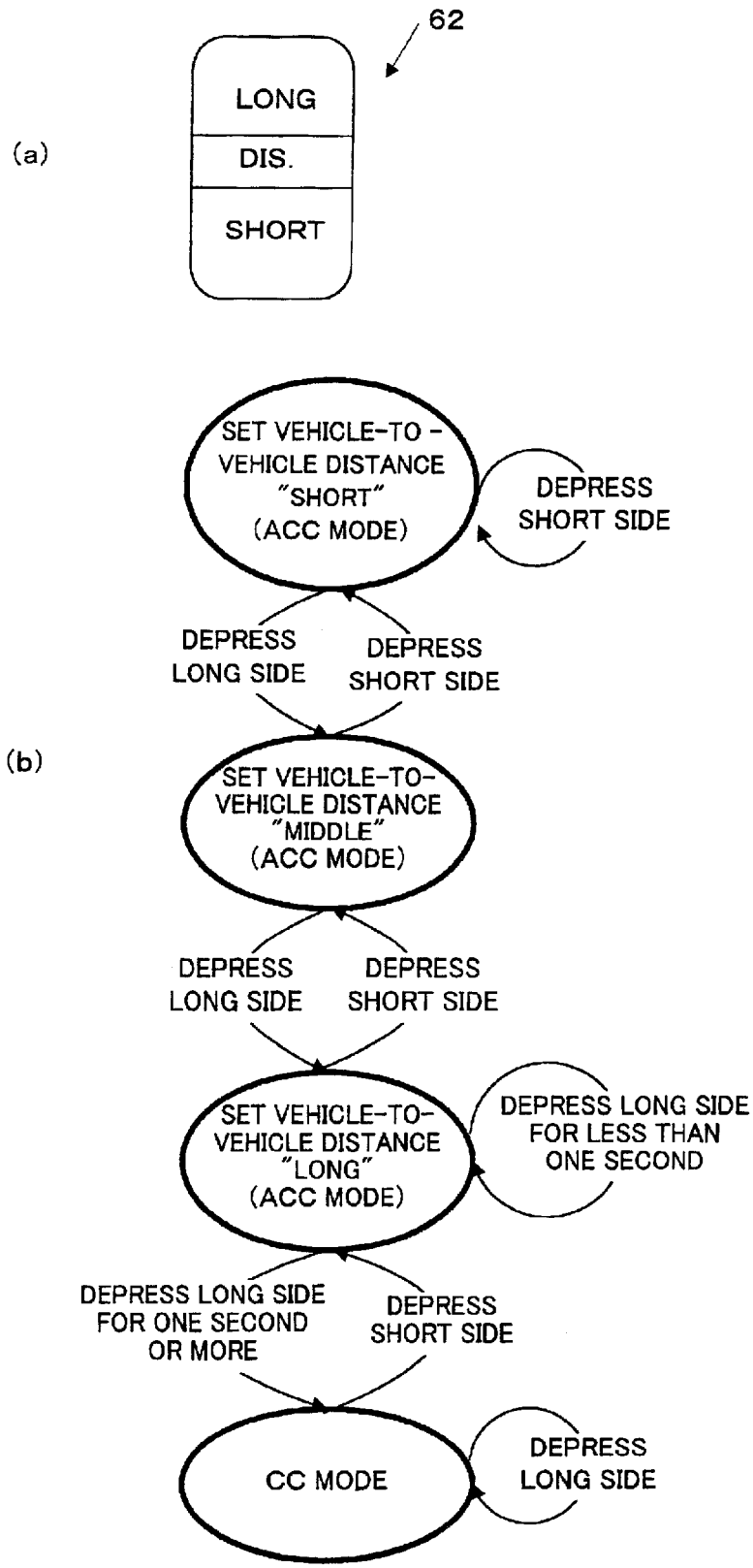
FIG. 8 illustrates an embodiment of a distance switch (a) and transitional states (b) in which the control states may transit in accordance with the operations upon the distance switch in accordance with an embodiment of the invention.

FIG. 8 shows a third embodiment of the switch. FIG. 8 (a) shows a distance switch 62 for the driver to switch the set vehicle-to-vehicle distance to either "long", "middle" or "short" distance. A vehicle-to-vehicle distance may be represented by a headway (which means a time interval from now to the time when the subject vehicle will reach the current position of the preceding vehicle if the subject vehicle travels at the current speed). The "long" headway corresponds to 2.5 seconds, "middle" to 2.1 seconds and "short" to 1.7 seconds respectively. For example, assuming that the speed of the subject vehicle is 80 km/h, the "long" headway corresponds to about 56 m, "middle" to about 47 m, and "short" to 38 m respectively. When the "LONG" side of the distance switch 62 is depressed, the set distance is increased by one stage. If the "SHORT" side is depressed, the set speed is decreased by one stage.

Any setting for the vehicle-to-vehicle distance may be possible. Any other number of the stages of the distance than the aforementioned may be possible and the aforementioned headway may be set differently.

FIG. 8 (b) illustrates how the control states of the ACC system are transited in accordance with the operations upon the switch in the embodiment where the distance switch is provided with a mode switching function. In order to achieve the transition to the CC mode, the LONG side of the switch must be depressed for the predetermined time period or more after the set distance has been changed to the "LONG" by means of several depressions on the LONG side. Thus, because the transition to the CC mode may only take place when the set distance has been changed to "LONG" and then the switch has been depressed for the predetermined time period or more, any easy transition to the CC mode could be prevented. In contrast, if the SHORT side is depressed when in the CC mode, the transition from the CC mode to the ACC mode may take place. Thus, since the transition from the CC mode to the ACC mode can be relatively easily performed, the operational convenience could be enhanced.

It is preferable that the set vehicle-to-vehicle distance is set to "middle" when the ACC system is activated. If the LONG side is depressed for 1 second or more in the "long" distance state, the system may transit to the CC mode. Accordingly, if the set difference is set to "middle" when the ACC system is activated, an easy transition to the CC system due to some wrong operation during a period while the ACC system is activated, could be prevented.

The distance switch as shown in FIG. 8 (a) may be used in combination with such cruise switch as shown in FIG. 6 (a) or 7 (a). In this case, a mode switching function can be given to either of such switches. Besides, as for the integrated type switch as shown in FIG. 6 (b), a mode switching function can be given to the DISTANCE side rather than the ON side. If the mode switching function is provided on the cruise switch, the distance switch should have only the function for setting the set vehicle-o-vehicle distance. On the other hand, when the mode switching function is provided on the distance switch, the cruise switch should have only the function for switching the ON/OF states of the ACC system.

Figure 9:
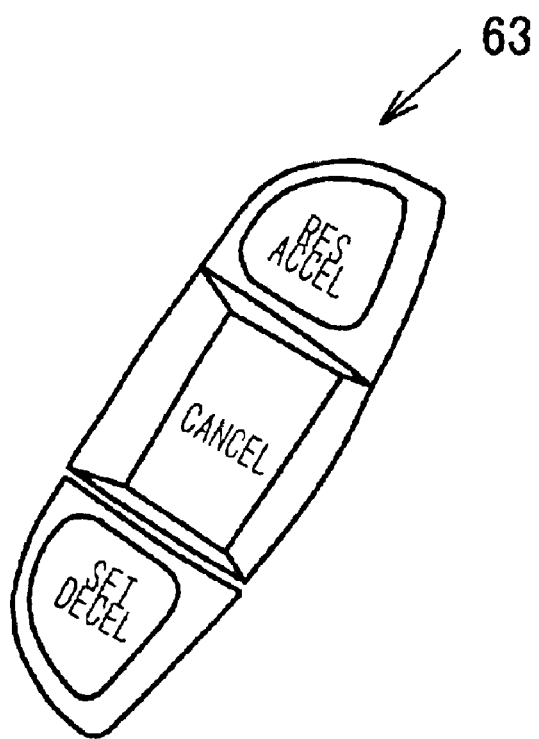
FIG. 9 illustrates an embodiment of a set/resume/cancel switch in accordance with an embodiment of the invention.

FIG. 9 illustrates a set/resume/cancel switch 63 comprising a SET/DECEL switch, a CANCEL switch and a RES/ACCEL switch. The SET/DECEL switch is to set the vehicle speed. If the SET/DECEL switch is depressed and then released when the subject vehicle reaches to the desired speed by means of the operation of the accelerator pedal, the vehicle speed at the moment when the switch has been released is set as the set vehicle speed. After the vehicle speed has been set, the set vehicle speed may be incremented by a predetermined quantity (for example, 2 km/h) for each depression on the RES/ACCEL, and in contrast, the set vehicle speed may be decremented by a predetermined quantity (for example, 2 km/h) for each depression on the SET/DECEL. The CANCEL switch is to temporarily cancel the vehicle-to-vehicle distance control by the ACC system. Even after the cancellation, the vehicle-to-vehicle distance control could be resumed by the depression on the RES/ACCEL switch as long as the set vehicle speed is still displayed on the display 48 (see FIG. 10).

It should be noted that the embodiments of the cruise control switch shown in FIG. 6 through FIG. 9 are only for the illustration purpose and any other input means may be alternatively employed. For example, a lever-like operation switch or a touch-panel type switch may be used.

Figure 10:
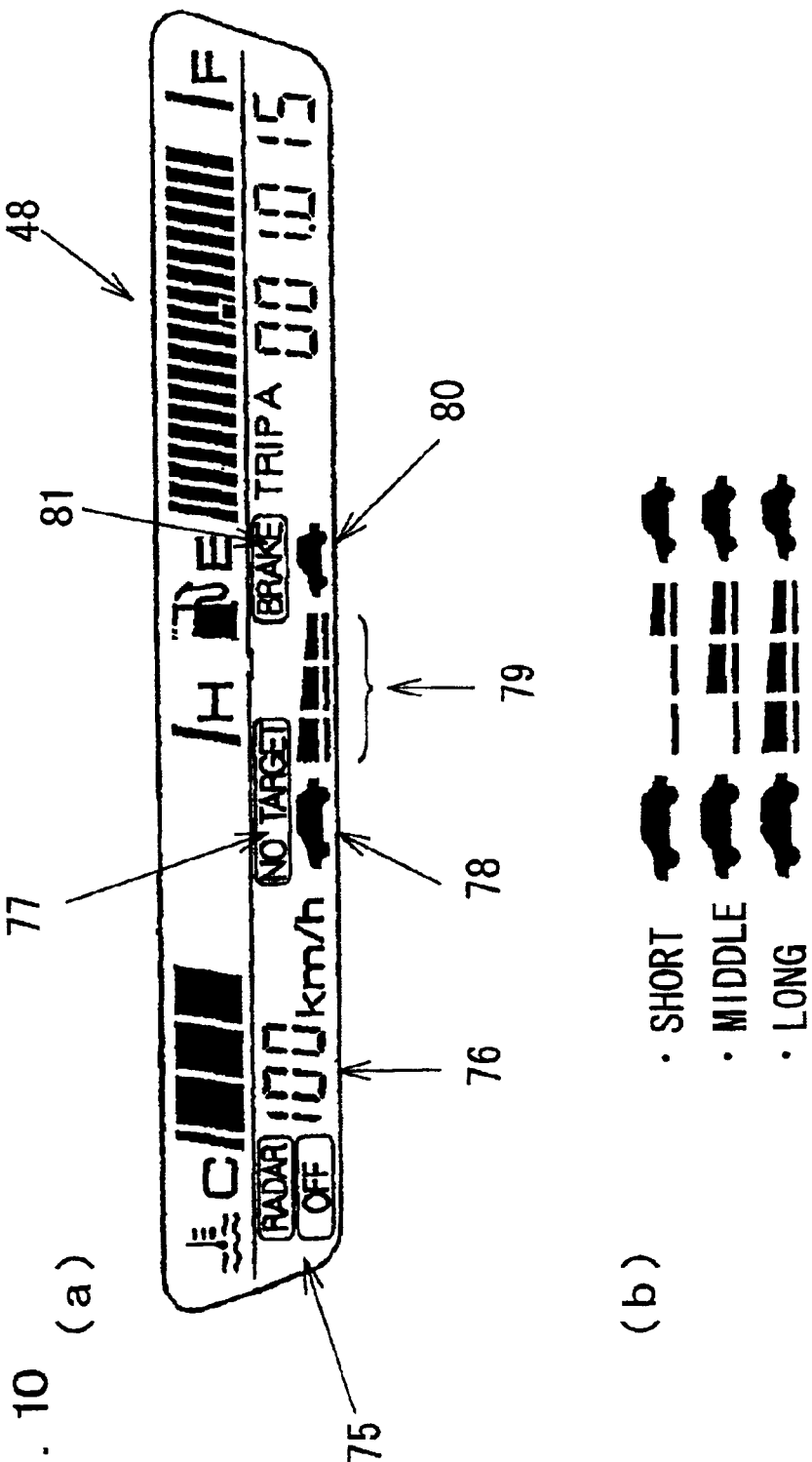
FIG. 10 illustrates an example of the display in accordance with an embodiment of the invention.

FIG. 10 (a) shows an exemplary display of the display 48. A RADAR/OFF display indicated by the reference numeral 75 is displayed for a predetermined time period (for example 5 seconds) when the ACC system has been canceled automatically. The area indicated by the reference numeral 76 displays the set vehicle speed. The display of the vehicle speed blinks while the speed is being accelerated up to the set vehicle speed. "NO TARGET" indicated by the reference numeral 77 is displayed when no preceding vehicle is determined by the preceding vehicle determining section 51.

The display indicated by the reference numeral 78 is to indicate the preceding vehicle and appears when the preceding vehicle is detected. The display indicated by the reference numeral 80 is to indicate the subject vehicle. The set vehicle-to-vehicle distance is displayed in the area 79 between the preceding vehicle 78 and the subject vehicle 80.

The set vehicle-to-vehicle distance is indicated by means of the bars corresponding to three stages (long, middle and short) as illustrated in FIG. 10 (b). Specifically, three bars indicate that the set vehicle-to-vehicle distance is long, two bars middle and one bar short. Accordingly, the driver could look over this display at a glance so as to recognize which distance is currently being set. The display "BRAKE" indicated by the reference numeral 81 blinks when the driver is requested to operate the brake pedal, for example, when the subject vehicle is too closely approaching to the preceding vehicle.

Whenever the display content is switched, the buzzer is alarmed to draw the driver's attention. For example, upon the display of "NO TARGET", the buzzer is alarmed, so that the driver could recognize through both of the display and the buzzer that no preceding vehicle is being detected for some reason.

Figure 11:
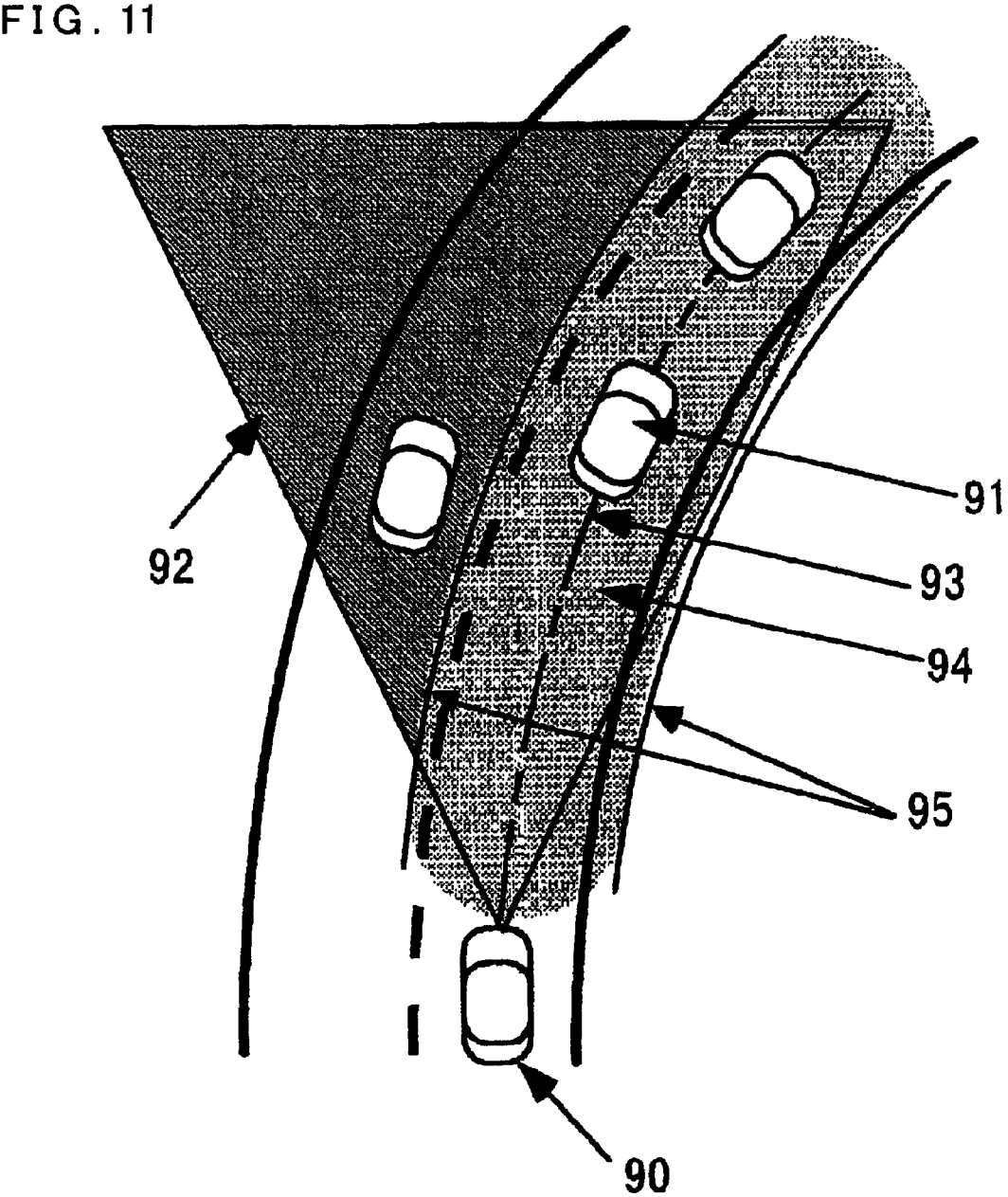
FIG. 11 illustrates how to determine a preceding vehicle in accordance with an embodiment of the invention.

FIG. 11 is an illustration to be used to explain how the preceding vehicle determining section 51 determines preceding vehicles. A triangle area 92 represents a detected area that can be detected by an object detecting device mounted on the subject vehicle 90. The preceding vehicle determining section 51 assumes an equal-speed circulatory movement based on the yaw rate and the vehicle speed which are detected by the yaw rate sensor 41 and the wheel speed sensor 42 so as to calculate a travel trajectory 93 of the subject vehicle (referred to as an estimated trajectory of the subject vehicle). Then, the preceding vehicle determining section 51 calculates an area having a predetermined width in the center of which the estimated subject vehicle trajectory is to be placed (for example, such area that has ±2 m width along the estimated subject vehicle trajectory) and then defines the calculated area as an estimated subject vehicle lane 94 (namely an area sandwiched by two curves 95 shown in FIG. 11). As for the moving vehicles which have been detected by the object detecting device and also are existing within the overlapping area of the estimated subject vehicle lane 94 and the detected area 92, the preceding vehicle determining section 51 selects one moving vehicle that is located at the nearest position to the subject vehicle so as to determine such selected vehicle as the preceding vehicle 91. It should be noted that if the road curvature changes, the preceding vehicle may go out of the estimated subject vehicle lane. Therefore, an interpolation process may be required in a certain condition.

Figure 12:
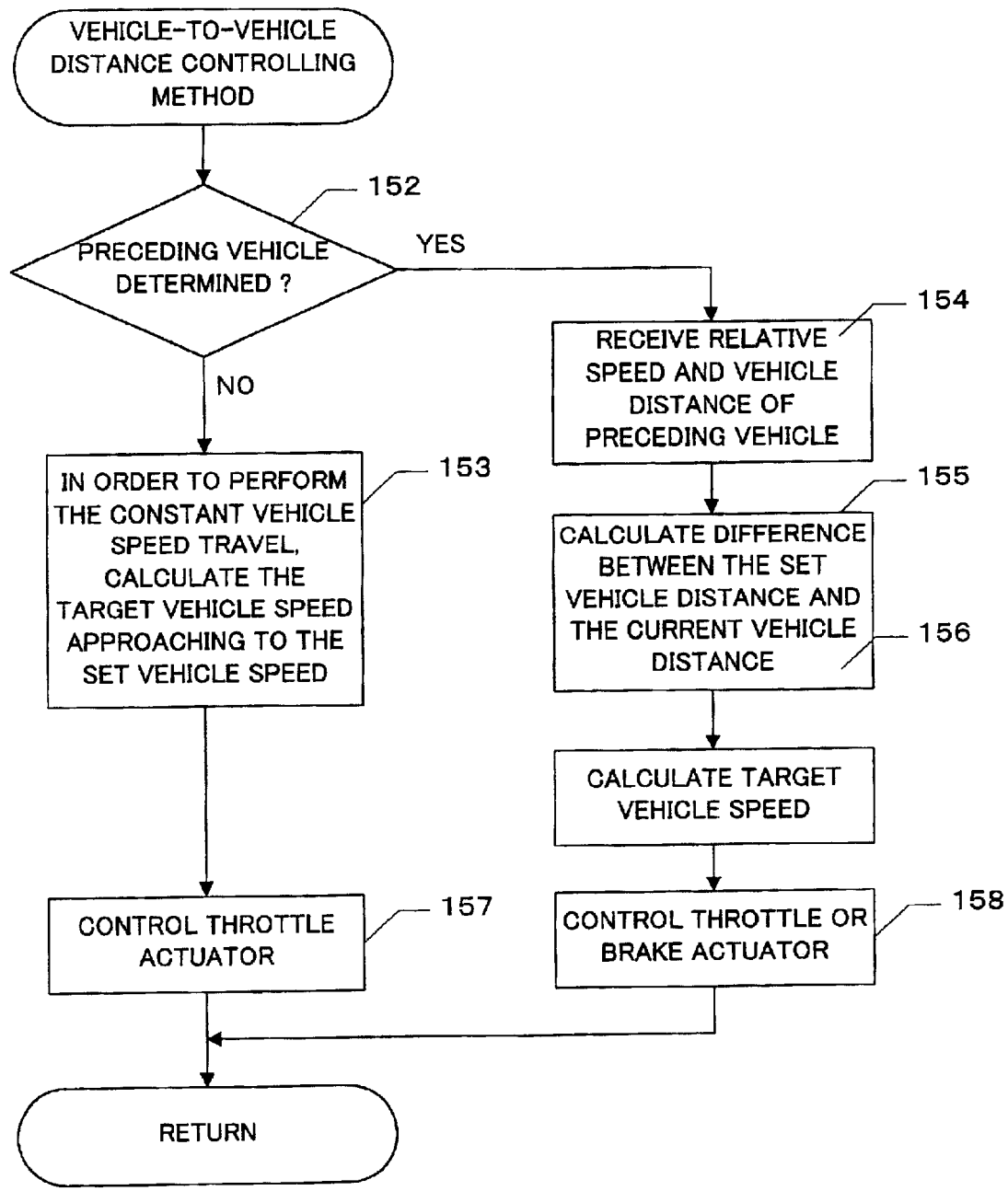
FIG. 12 is a flow chart illustrating how to control the vehicle-to-vehicle distance in accordance with an embodiment of the invention.

FIG. 12 illustrates a flow of the process for the vehicle-to-vehicle distance control performed by the vehicle-to-vehicle distance controller 52. In step 152, it is examined whether any preceding vehicle has been determined or not by the preceding vehicle determining section 51. If no preceding vehicle has been determined, the vehicle-to-vehicle distance controller 52 adjusts the target vehicle speed to the set vehicle speed that has been set through the cruise control switch 43 (step 153) and controls the throttle actuator 46 so as to travel at the set vehicle speed (step 157). Thus, when no preceding vehicle is detected, the constant vehicle speed travel to maintain the set vehicle speed is performed.

If a preceding vehicle is detected in step 152, the vehicle-to-vehicle distance controller 52 receives the relative vehicle speed of the preceding vehicle and the vehicle-to-vehicle distance (step 154). In step 155, the vehicle-to-vehicle distance controller 52 compares the received vehicle-to-vehicle distance with the set vehicle-to-vehicle distance set via the distance switch 62 to calculate the difference. In step 156, the vehicle-to-vehicle distance controller 52 calculates the target vehicle speed so as to make the calculated difference zero based on the relative speed and the speed of the subject vehicle, and in step 158 it controls the throttle actuator 46 or the brake actuator 47 so as to make the vehicle speed equal to the set vehicle speed. If the deceleration achieved by the throttle control is not sufficient when decelerating the vehicle speed, the brake actuator 47 may be driven accordingly.

Figure 13:
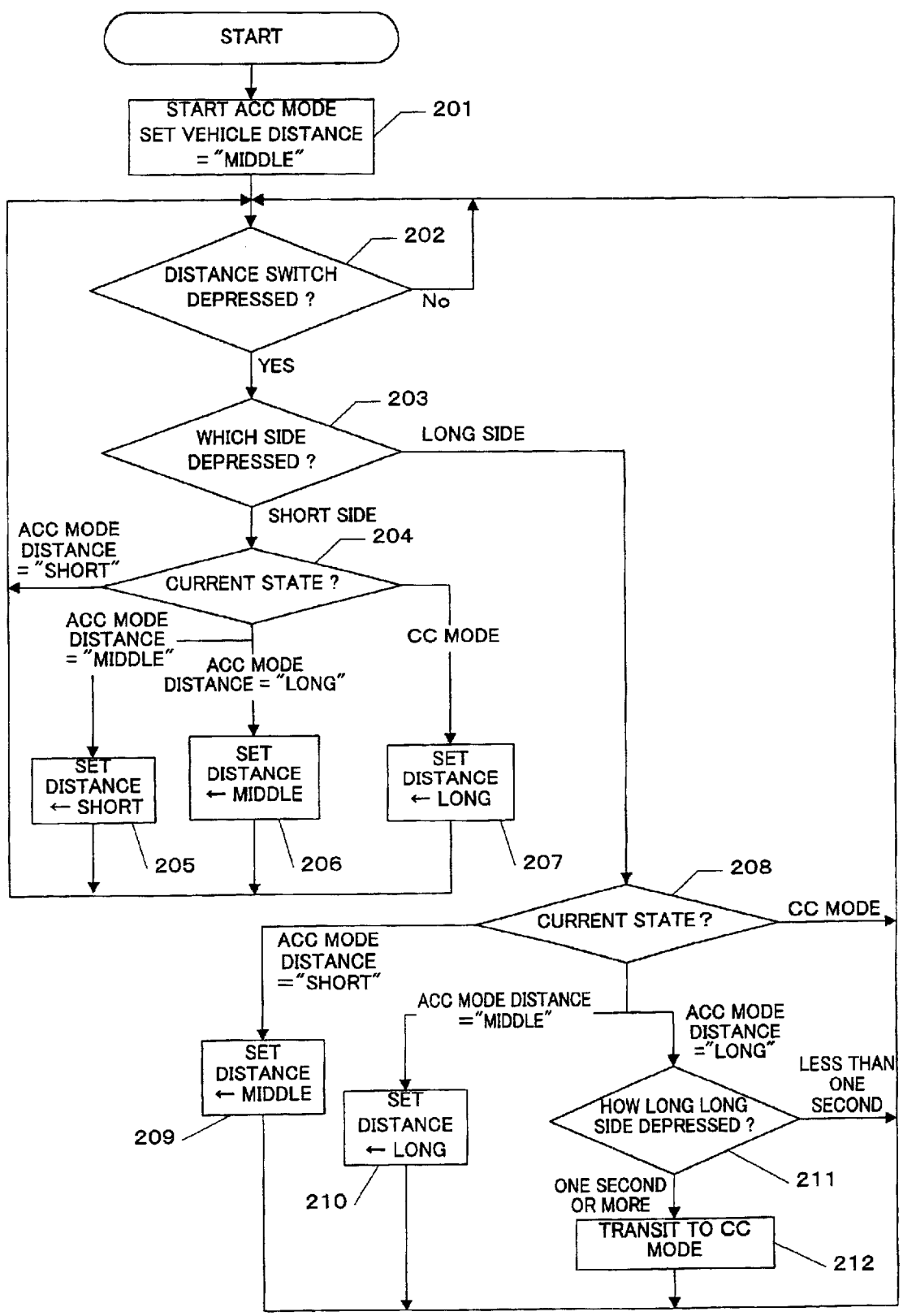
FIG. 13 is a flow chart illustrating how to switch between the ACC mode and the CC mode in accordance with a first embodiment of the invention.

FIG. 13 illustrates a flow chart of a first switching method between the CC mode and the ACC mode performed by the mode selector 54. Assume in this flow chart that the switching is performed through use of the distance switch 62 (FIG. 8). Further assume that the set vehicle-to-vehicle distance is set to "middle" and the vehicle-to-vehicle distance control is started when the cruise switch 61 is set to "ON" to activate the ACC system.

After the set vehicle-to-vehicle distance has been set to "middle" and the vehicle-to-vehicle distance control has been started in step 201, the mode selector 54 determines whether the distance switch has been depressed or not in step 202. If depressed, in step 203, it is determined which side, LONG side or SHORT side, has been depressed. If the SHORT side has been depressed, in step 204, the current set vehicle-to-vehicle distance is decremented by one stage: namely, if the current set distance is "long", it is decremented to "middle" (step 205); if the current set distance is "middle", it is decremented to "short" (step 206); and if the current set distance is "short", then the process returns to step 202. Besides, if the vehicle-to-vehicle distance is not set currently and the system is in the CC mode, the set distance is set to "long", which will be resulted in a transition from the CC mode to the ACC mode (step 207).

If the LONG side is depressed in step 203, the process proceeds to step 208, where the set vehicle-to-vehicle distance is incremented by one stage from the current set distance: namely if the current set distance is "short", it is incremented to "middle" (step 209); if the current set distance is "middle", it is incremented to "long" (step 210); and if the current set distance is "long", the process examines how long the LONG side has been depressed. If it has been depressed for one second or more, the system transits to the CC mode (step 211, 212) and if it has been depressed for less than one second, the process returns to step 202. Besides, if the vehicle-to-vehicle distance is not set currently and the system is in the CC mode, the process returns to step 202.

FIG. 14 illustrates an exemplary display of the ACC mode and the CC mode. FIG. 14 (a) illustrates an example of the display during the ACC mode travel in which the subject vehicle is following the preceding vehicle with the set vehicle speed of 90 km/h and the set vehicle-to-vehicle distance of "long". FIG. 14 (b) illustrates an example of the display during the CC mode in which any preceding vehicle and the set vehicle-to-vehicle distance are not displayed because a preceding vehicle detection is not performed in the CC mode. Besides, "CC" is displayed instead of the set vehicle speed. In this case, the set vehicle speed is not required to be displayed because the current vehicle speed indicated in the speedometer actually represents the set vehicle speed. FIG. 14 (c) illustrates another example of the display during the CC mode in which "NO TARGET" is displayed differently from the above (b) case. In such way, the driver could distinguish at a glance whether the subject vehicle is currently traveling in the CC mode or in the ACC mode.

Figure 15:
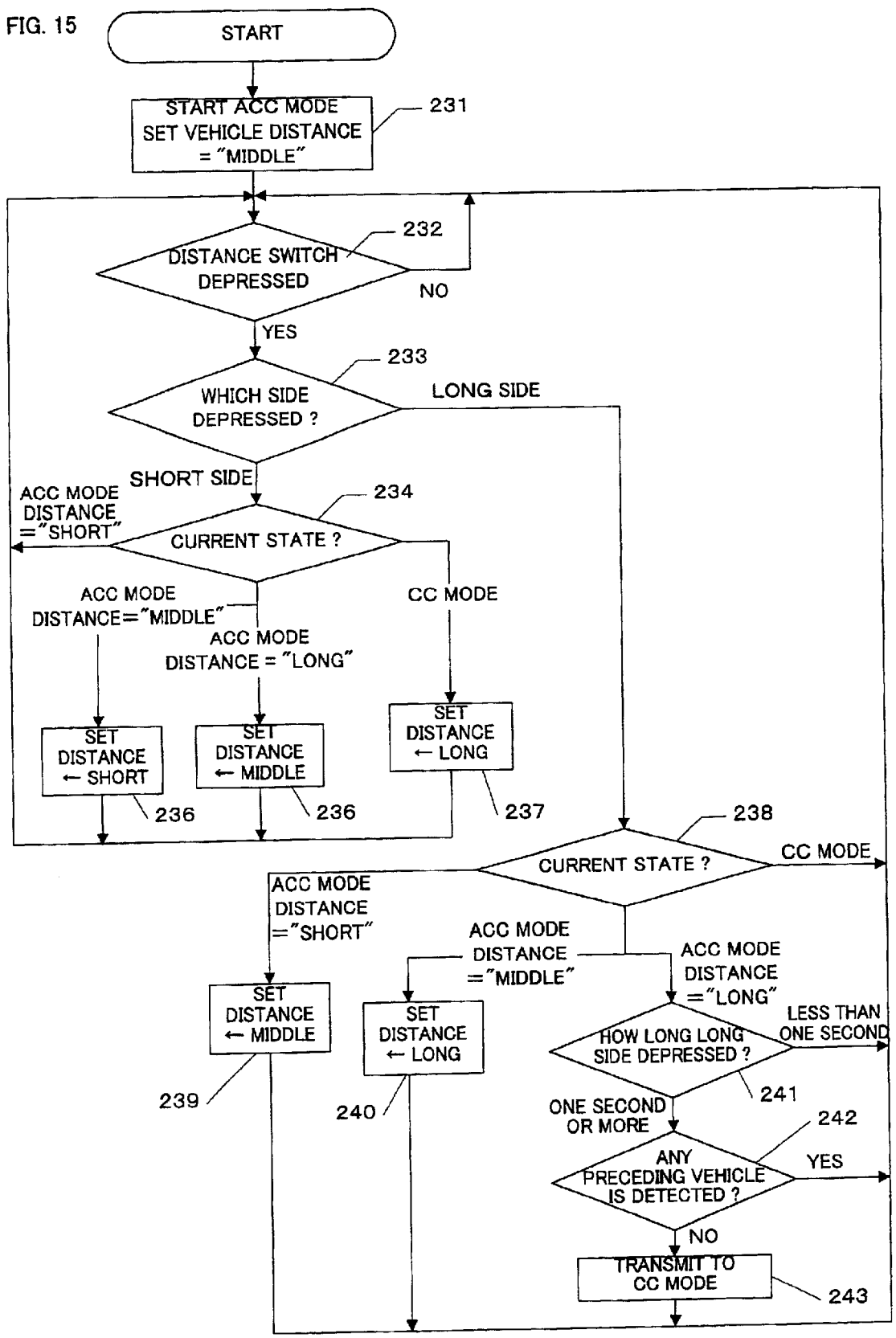
FIG. 15 is a flow chart illustrating how to switch between the ACC mode and the CC mode in accordance with a second embodiment of the invention.

FIG. 15 illustrates a flow chart of a second switching method between the CC mode and the ACC mode. The second switching method is different from the first one in that no switching from the ACC mode to the CC mode is allowed while the preceding vehicle is being detected during the ACC mode travel. If the transition to the CC mode is performed while the subject vehicle is following the preceding vehicle that is traveling at a slower speed than that of the subject vehicle, the system may start to accelerate to return to the set vehicle speed, so the driver may be disquieted. Thus, the second switching method is intended to prevent this kind of unexpected acceleration.

Steps 231 through 241 are the same as steps 201 through 211 in FIG. 13. In step 242, the process determines whether any preceding vehicle is detected or not. If it is not detected, the system transits to the CC mode in step 243, and if it is detected, the process does not perform the transition to the CC mode but returns to step 232.

Figure 16:
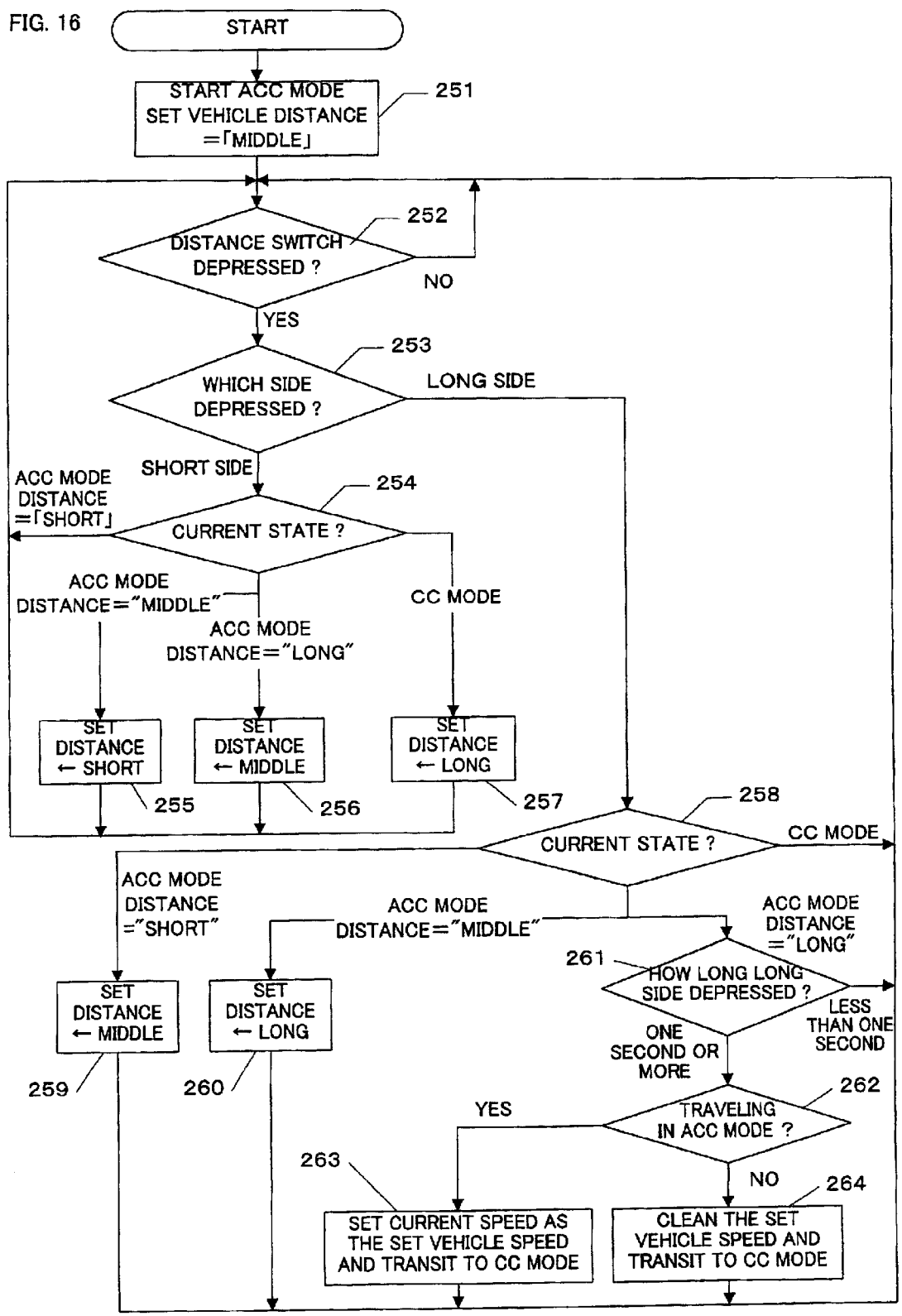
FIG. 16 is a flow chart illustrating how to switch between the ACC mode and the CC mode in accordance with a third embodiment of the invention.

FIG. 16 illustrates a flow chart of a third switching method between the CC mode and the ACC mode. The third switching method is different from the first one in that the current vehicle speed is set to the set vehicle speed when a transition from the ACC mode to the CC mode is performed. Similarly as in the case of FIG. 15, if the transition to the CC mode is performed while the subject vehicle is following the preceding vehicle that is traveling at a slower speed than that of the subject vehicle, the system may start to accelerate to return to the set vehicle speed, so the driver may be disquieted. Thus, the third switching method is also intended to prevent this kind of unexpected acceleration.

Steps 251 through 261 are the same as steps 201 through 211 in FIG. 13. In step 262, the process determines whether the subject vehicle is currently traveling in the ACC mode or not. If in the ACC mode, the system performs the transition to the CC mode after having set the set vehicle speed to the current vehicle speed in step 263. Thus, even if the transition to the CC mode is performed while the subject vehicle is traveling at a lower speed than the set vehicle speed, the constant vehicle speed travel may start with that lower speed, so that an immediate and unexpected acceleration could be prevented.

On the other hand, if, in step 262, the subject vehicle is determined to be not traveling in the ACC mode, the system, in step 264, clears the set vehicle speed and then transits to the CC mode. In this case, after the transition to the CC mode, the driver must set the set vehicle speed again. One of the cases where the subject vehicle is determined to be not traveling in the ACC mode in step 262 (that is, the result of the determination in step 262 is "NO") may be, for example, a case where the ACC system has been temporarily canceled by means of depression upon the cancel switch of the cruise control switch. In this case, the vehicle-to-vehicle distance control is temporarily disabled but the set vehicle speed may remain valid (the set vehicle speed is still being displayed). If the transition to the CC mode is tried from this state, an acceleration operation may be started to return to the set vehicle speed. Therefore, in step 264, the set vehicle speed must be cleared so as to prevent an immediate and unexpected acceleration.

Several switching methods between the vehicle-to-vehicle distance control mode and the constant vehicle speed control mode in the ACC system in accordance with the invention have been above described. In accordance with the invention, it is possible to switch between the vehicle-to-vehicle distance control mode and the constant vehicle speed control mode using the existing switch that is provided for operating the vehicle-to-vehicle distance control by the ACC system.

What is claimed is:

1. An auto-cruise apparatus comprising, vehicle-to-vehicle distance controller for controlling a vehicle speed of a subject vehicle with a set vehicle speed as an upper limit of said vehicle speed such that a vehicle-to-vehicle distance between said subject vehicle and a preceding vehicle becomes equal to a set vehicle-to-vehicle distance and controlling said vehicle speed such that said vehicle speed becomes equal to said set vehicle speed when it is determined that there exists no preceding vehicle and input means capable of being operated by a driver with regard to a vehicle-to-vehicle distance control performed by said vehicle-to-vehicle distance controller wherein said set vehicle-to-vehicle distance and said set vehicle speed can be set by said driver via said input means, said auto-cruise apparatus further comprising:

a constant vehicle speed controller for controlling said vehicle speed such that said vehicle speed is maintained at said set vehicle speed whether a preceding vehicle may exist or not; and a mode selector for selecting, in accordance with predetermined operations upon said input means, either a vehicle-to-vehicle distance control mode in which a travel of said subject vehicle is controlled by said vehicle-to-vehicle distance controller or a constant vehicle speed control mode in which said travel is controlled by said constant vehicle speed controller, wherein a travel control by either said vehicle-to-vehicle distance controller or said constant vehicle speed controller is performed in accordance with a travel mode that has been selected by said mode selector;

wherein said input means further cpmprises vehicle-to-vehicle distance setting means for setting said set vehicle-to-vehicle distance; and wherein said mode selector performs a switching from said constant vehicle speed control mode to said vehicle-to-vehicle distance control mode in response to such operation upon said vehicle-to-vehicle distance setting means that decreases said vehicle-to-vehicle distance when the subject vehicle is in said constant vehicle speed control mode.

2. An auto-cruise apparatus comprising a vehicle-to-vehicle distance controller for controlling a vehicle speed of a subject vehicle with a set vehicle speed as an upper limit of said vehicle speed such that a vehicle-to-vehicle distance between said subject vehicle and a preceding vehicle becomes equal to a set vehicle-to-vehicle distance and controlling said vehicle speed such that said vehicle speed becomes equal to said set vehicle speed when it is determined that there exists no preceding vehicle and input means capable of being operated by a driver with regard to a vehicle-to-vehicle distance control performed by said vehicle-to-vehicle distance controller wherein said set vehicle-to-vehicle distance and said set vehicle speed can be set by said driver via said input means, said auto-cruise apparatus further comprising:

a contstant vehicle speed controller for controlling said vehicle speed such that said vehicle speed is maintained at said set vehicle speed whether a preceding vehicle may exist or not; and a mode selector for selecting, in accordance with predetermined operations upon said input means, either a vehicle-to-vehicle distance control mode in which a travel of said subject vehicle is controlled by said vehicle-to-vehicle distance controller or a constant vehicle speed control mode in which said travel is controlled by said constant vehicle speed controller;

wherein a travel control by either said vehicle-to-vehicle distance controller or said constant vehicle speed controller is performed in accordance with a travel mode that has been selected by said mode selector;

wherein said input means further comprises vehicle-to-vehicle distance setting means for setting said set vehicle-to-vehicle distance; and wherein said mode selector performs a switching from said vehicle-to-vehicle distance control mode to said constant vehicle speed control mode in response to such operation upon said vehicle-to-vehicle distance setting means that increase said vehicle-to-vehicle distance and is performed for a predetermined time period or more when the subject vehicle is in said vehicle-to-vehicle distance control mode.

3. An auto-cruise apparatus comprising a vehicle-to-vehicle distance controller for controlling a vehicle speed of a subject vehicle with a set vehicle speed as an upper limit of said vehicle speed such that a vehicle-to-vehicle distance between said subject vehicle and a preceding vehicle becomes equal to a set vehicle-to-vehicle distance and controlling said vehicle speed such that said vehicle speed becomes equal to said set vehicle speed when it is determined that there exists no preceding vehicle and input means capable of being operated by a driver with regard to a vehicle-to-vehicle distance control performed by said vehicle-to-vehicle distance controller wherein said set vehicle-to-vehicle distance and said set vehicle speeed can be set by said driver via said input means, said auto-cruise apparatus further comprising:

a constant vehicle speed controller for controlling said vehicle speed such that said vehicle speed is maintained at said set vehicle speed whether a preceding vehicle may exist or not; and a mode selector for selecting, in accordance with predetermined operations upon said input device means, either a vehicle-to-vehicle distance control mode in which a travel of said subject vehicle is controlled by said vehicle-to-vehicle distance controller or a constant vehicle speed control mode in which said travel is controlled by said constant vehicle speed controller, wherein a travel control by either said vehicle-to-vehicle distance controller or said constant vehicle speed controller is performed in accordance with a travel mode that has been selected by said mode selector;

wherein said input means further comprises vehicle-to-vehicle distance setting means capable of setting said vehicle-to-vehicle distance to at least a long, middle or short distance; and wherein said mode selector performs a switching from said vehicle-to-vehicle distance control mode to said constant vehicle speed control mode in response to such operation upon said vehicle-to-vehicle distance setting means that increases said vehicle-to-vehicle distance and is performed for a predetermined time period or more when said vehicle-to-vehicle distance is set to long.

4. An auto-cruise apparatus as claimed in claim 3, wherein said input means further comprises a cruise switch for switching between a control state in which a vehicle-to-vehicle distance control by said vehicle-to-vehicle distance controller or a constant vehicle speed control by said constant vehicle speed controller is performed and a non-control state in which both said vehicle-to-vehicle distance control and said constant vehicle speed control are disabled; and wherein said set vehicle-to-vehicle distance is set to middle when said non-control state is switched to said vehicle-to-vehicle distance control mode.

* * * * *